United States Patent
Mori et al.

(10) Patent No.: US 9,918,201 B2
(45) Date of Patent: Mar. 13, 2018

(54) LOCATION DETERMINATION, MAPPING, AND DATA MANAGEMENT THROUGH CROWDSOURCING

(71) Applicant: Samsung Electronics Co., Ltd., Gyeonggi-do (KR)

(72) Inventors: Koichi Mori, San Jose, CA (US); Satheesh Sudarsan, San Jose, CA (US); Danny Bennett, Fremont, CA (US); Yifei Jiang, Santa Clara, CA (US); Yannick Pellet, San Mateo, CA (US); Jasvinder Singh, Santa Clara, CA (US); Shalinder Sidhu, Saratoga, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/299,869

(22) Filed: Oct. 21, 2016

(65) Prior Publication Data
US 2017/0041761 A1    Feb. 9, 2017

Related U.S. Application Data

(62) Division of application No. 14/639,076, filed on Mar. 4, 2015, now Pat. No. 9,510,154.

(Continued)

(51) Int. Cl.
*H04W 4/02*       (2009.01)
*G01C 21/34*      (2006.01)
(Continued)

(52) U.S. Cl.
CPC .......... *H04W 4/028* (2013.01); *G01C 21/206* (2013.01); *G01C 21/34* (2013.01); *G01S 5/02* (2013.01);
(Continued)

(58) Field of Classification Search
CPC ..... G01C 21/206; G01C 21/34; G01S 5/0252; G01S 5/0294; G01S 11/06; G01S 19/05;
(Continued)

(56) References Cited

U.S. PATENT DOCUMENTS 6,549,915 B2    4/2003  Abbot, III et al.
7,215,969 B2    5/2007  Benco et al.
(Continued)

FOREIGN PATENT DOCUMENTS

| | | |
|---|---|---|
| EP | 2615420 A2 | 7/2013 |
| KR | 1020130077764 A | 7/2013 |
| WO | 2014026338 A1 | 2/2014 |

OTHER PUBLICATIONS

"Crowdmap," [online] retrieved from the Internet: <https://crowdmap.com/welcome>, visited Nov. 4, 2014, 3 pg.

(Continued)

*Primary Examiner* — Nathan Taylor
(74) *Attorney, Agent, or Firm* — Cuenot, Forsythe & Kim, LLC

(57) ABSTRACT

Mapping through crowdsourcing includes determining, using a processor, segments for a plurality of trajectories, wherein each trajectory includes radio frequency (RF) data from a communication device, determining, using the processor, RF features for the segments, and forming, using the processor, clusters of the segments according to the RF features. One or more routes of a map are generated from the clusters using the processor.

17 Claims, 15 Drawing Sheets

Related U.S. Application Data

(60) Provisional application No. 61/985,140, filed on Apr. 28, 2014.

(51) Int. Cl.

| | |
|---|---|
| G01S 5/02 | (2010.01) |
| G01S 19/05 | (2010.01) |
| G01S 11/06 | (2006.01) |
| G01C 21/20 | (2006.01) |
| H04W 84/12 | (2009.01) |

(52) U.S. Cl.
CPC .......... *G01S 5/0252* (2013.01); *G01S 5/0294* (2013.01); *G01S 11/06* (2013.01); *G01S 19/05* (2013.01); *H04W 4/023* (2013.01); *H04W 84/12* (2013.01)

(58) Field of Classification Search
CPC ......... G01S 5/02; H04W 4/023; H04W 4/028; H04W 84/12
USPC ....................................................... 455/436
See application file for complete search history.

(56) References Cited

U.S. PATENT DOCUMENTS

| | | | |
|---|---|---|---|
| 8,301,364 B2 | 10/2012 | Rolf et al. | |
| 8,320,939 B1 | 11/2012 | Vincent | |
| 8,350,758 B1 | 1/2013 | Parvizi et al. | |
| 8,374,632 B2 | 2/2013 | Risitch et al. | |
| 8,386,422 B1 | 2/2013 | Kadous et al. | |
| 8,407,003 B2 | 3/2013 | Geelen et al. | |
| 8,472,980 B2 | 6/2013 | Khorashadi et al. | |
| 8,543,143 B2 | 9/2013 | Chandra et al. | |
| 8,565,783 B2 | 10/2013 | Yang et al. | |
| 8,594,701 B2 | 11/2013 | Pakzad | |
| 8,694,240 B1 | 4/2014 | Lookingbill et al. | |
| 2006/0238409 A1 | 10/2006 | Yoshioka et al. | |
| 2009/0113018 A1 | 4/2009 | Thomson et al. | |
| 2010/0039929 A1 | 2/2010 | Cho et al. | |
| 2010/0198814 A1 | 8/2010 | Petersen et al. | |
| 2011/0151898 A1 | 6/2011 | Chandra et al. | |
| 2011/0163914 A1 | 7/2011 | Seymour | |
| 2011/0244919 A1 | 10/2011 | Aller et al. | |
| 2011/0285591 A1 | 11/2011 | Wong | |
| 2011/0313779 A1 | 12/2011 | Herzog et al. | |
| 2012/0021762 A1 | 1/2012 | Garin et al. | |
| 2012/0028577 A1 | 2/2012 | Rodriguez et al. | |
| 2012/0102164 A1 | 4/2012 | Gruen et al. | |
| 2012/0102165 A1 | 4/2012 | Gruen et al. | |
| 2012/0130625 A1 | 5/2012 | Srivastava | |
| 2012/0130762 A1 | 5/2012 | Gale et al. | |
| 2012/0143495 A1 | 6/2012 | Dantu | |
| 2012/0182933 A1 | 7/2012 | Gandhakavi et al. | |
| 2012/0184292 A1 | 7/2012 | Lin et al. | |
| 2012/0185458 A1 | 7/2012 | Liu et al. | |
| 2012/0294532 A1 | 11/2012 | Morris | |
| 2012/0303556 A1 | 11/2012 | Lin et al. | |
| 2012/0310529 A1 | 12/2012 | Hamilton et al. | |
| 2013/0018581 A1 | 1/2013 | Sidhu et al. | |
| 2013/0018629 A1 | 1/2013 | Sidhu et al. | |
| 2013/0018826 A1* | 1/2013 | Sundararajan ...... | H04L 12/6418 706/12 |
| 2013/0023282 A1 | 1/2013 | Lin et al. | |
| 2013/0053056 A1* | 2/2013 | Aggarwal ............. | G01S 5/0263 455/456.1 |
| 2013/0084882 A1 | 4/2013 | Khorashadi et al. | |
| 2013/0084891 A1 | 4/2013 | Khorashadi et al. | |
| 2013/0095849 A1 | 4/2013 | Pakzad | |
| 2013/0116965 A1* | 5/2013 | Lin ......................... | G06F 15/00 702/150 |
| 2013/0122935 A1 | 5/2013 | Das et al. | |
| 2013/0177208 A1* | 7/2013 | Haverinen ........... | G01C 21/206 382/103 |
| 2013/0195314 A1* | 8/2013 | Wirola .................. | G01C 21/20 382/103 |
| 2013/0267255 A1 | 10/2013 | Liu et al. | |
| 2013/0281111 A1* | 10/2013 | Syrjarinne ........... | G01S 5/0252 455/456.1 |
| 2013/0293416 A1* | 11/2013 | Waters .................. | G01S 19/48 342/357.31 |
| 2013/0307723 A1 | 11/2013 | Garin et al. | |
| 2013/0310064 A1* | 11/2013 | Brachet ................ | G01S 5/0236 455/456.1 |
| 2013/0332065 A1 | 12/2013 | Hakim et al. | |
| 2014/0011518 A1* | 1/2014 | Valaee ................. | G01S 5/0252 455/456.1 |
| 2014/0018095 A1 | 1/2014 | Parvizi et al. | |
| 2014/0067938 A1 | 3/2014 | Boldyrev et al. | |
| 2014/0080515 A1 | 3/2014 | Pakzad | |
| 2014/0088860 A1 | 3/2014 | Poornachandran et al. | |
| 2014/0114561 A1 | 4/2014 | Pakzad et al. | |
| 2014/0141796 A1 | 5/2014 | Marti et al. | |
| 2014/0141803 A1 | 5/2014 | Marti et al. | |
| 2015/0052097 A1 | 2/2015 | Song | |
| 2015/0312722 A1 | 10/2015 | Mori et al. | |
| 2016/0019257 A1 | 1/2016 | Wither | |
| 2016/0265918 A1* | 9/2016 | Sen ....................... | G01S 5/0252 |

OTHER PUBLICATIONS

Mea, D. et al., "Crowdsourcing to Mobile Users: A Study of the Role of Platforms and Tasks." In DBCrowd 2013: 1st VLDG Workshop on Databases and Crowdsourcing, pp. 14-19, 2013.
Subbu, P., et al., "Indoor Localization Using Magnetic Fields," Doctoral Dissertation, University of North Texas, Dec. 2011, 158 pg.
Subbu, K. et al., "LocateMe: Magnetic-fields-based Indoor Localization Using Smartphones," In ACM Transactions on Intelligent Systems and Technology (TIST) 4, No. 4 (2013): 73, Date: 2013.
Nguyen, T. et al., "Gathering and Utilizing Crowdsourced Pedestrian Flow Data from Mobile Devices," [online] Team 9 Project Report, CSCI 5980: From GPS & Google Earth to Spataial Computing, Dec. 12, 2012, retrieved from the Internet: <httpwww.tc.umn.edu~nguy16535980Team9FinalReport.pdf>, 31 pg.
Shin, H. et al., "Unsupervised Construction of an Indoor Floor Plan Using a Smartphone," In IEEE Trans. on Systems, Man, and Cybernetics, Part C: Applications and Reviews, vol. 42, No. 6 (2012): 889-898, Date: 2012.
Shen, G. et al., "Walkie-markie: Indoor Pathway Mapping Made Easy," In Proc.of 10th USENIX Conf.on Networked Systems Design and Implementation, USENIX Association pp. 85-98, 2013.
Dabek, F. et al., "Vivaldi: A Decentralized Network Coordinate System," In ACM SIGCOMM Computer communication Review, vol. 34, No. 4, pp. 15-26, ACM, 2004.
Bruno, L. et al., "Wislam: Improving Footslam with Wifi," In IEEE 2011 Int'l. Conf. on Indoor Positioning and Indoor Navigation (IPIN), pp. 1-10, IEEE, Sep. 2011.
Wang, H. et al., "UnLoc—Unsupervised Indoor Localization," In ACM MobiSys, 2012, 15 pg.
"Waze," [online] Waze Mobile © 2009-2015, viewed Nov. 4, 2014, , retrieved from the Internet: <https://www.waze.com/>, 3 pg.
Alzantot, M. et al., "CROWDINSIDE: Automatic Construction of Indoor Floorplans," In Proc. of 20th Int'l. Conf. on Advances in Geographic Information Systems, ACM, pp. 99-108, 2012.
WIPO Appln. PCT/KR2015/004109, Search Report, Jul. 29, 2015, 13 pg.
U.S. Appl. No. 14/639,076, Non-Final Office Action, dated Feb. 24, 2016, 14 pg.
U.S. Appl. No. 14/639,076, Notice of Allowance, dated Aug. 3, 2016, 20 pg.

* cited by examiner

LOCATION DETERMINATION, MAPPING, AND DATA MANAGEMENT THROUGH CROWDSOURCING

CROSS-REFERENCE TO RELATED APPLICATIONS

This application claims the benefit of U.S. Provisional Patent Application No. 61/985,140 filed on Apr. 28, 2014, which is fully incorporated herein by reference.

TECHNICAL FIELD

This disclosure relates to location determination, mapping, and data management through crowdsourcing.

BACKGROUND

A location-based service is a type of computer service that uses location data of a user device to perform a task or control one or more computer-based operations performed for and/or provided to a user. When a user is outdoors, the location of the user is often readily determined. For example, a user's communication device often includes a Global Positioning System (GPS) receiver that allows the communication device to determine accurate location information.

Determining the location of a user when indoors, however, can be difficult. When operating indoors, GPS receivers tend to be less reliable or are completely inoperable rendering GPS location data unavailable. Without GPS location data, providing high quality location based services to users when indoors is often problematic.

SUMMARY

A method includes determining using a processor, segments for a plurality of trajectories, wherein each trajectory includes radio frequency (RF) data from a communication device, determining, using the processor, RF features for the segments, and forming, using the processor, clusters of the segments according to the RF features. The method also includes generating, using the processor, routes for a map using the clusters.

A system includes a processor programmed to initiate executable operations. The executable operations include determining segments for a plurality of trajectories, wherein each trajectory comprises RF data from a communication device, determining RF features for the segments, and forming clusters of the segments according to the RF features. The executable operations also include generating routes for a map using the clusters.

A non-transitory computer-readable storage medium has instructions stored thereon which, when executed by a processor, perform a method. The method includes determining segments for a plurality of trajectories, wherein each trajectory includes RF data from a communication device, determining RF features for the segments, and forming clusters of the segments according to the RF features. The method also includes generating routes for a map using the clusters.

A method includes receiving, using a processor, data units from a plurality of communication devices over time, wherein each data unit includes location information, correlating, using the processor, the data units with regions of a map using the location information, and determining, using the processor, data densities for regions, wherein a data density specifies a number of data units received from the region over a period of time. The method also includes presenting, using the processor, an indicator of data density of the regions.

A system includes a processor programmed to initiate executable operations. The executable operations include receiving data units from a plurality of communication devices over time, wherein each data unit includes location information, correlating the data units with regions of a map using the location information, and determining data densities for regions, wherein a data density specifies a number of data units received from the region over a period of time. The executable operations may also include presenting an indicator of data density of the regions.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

Figure 1:
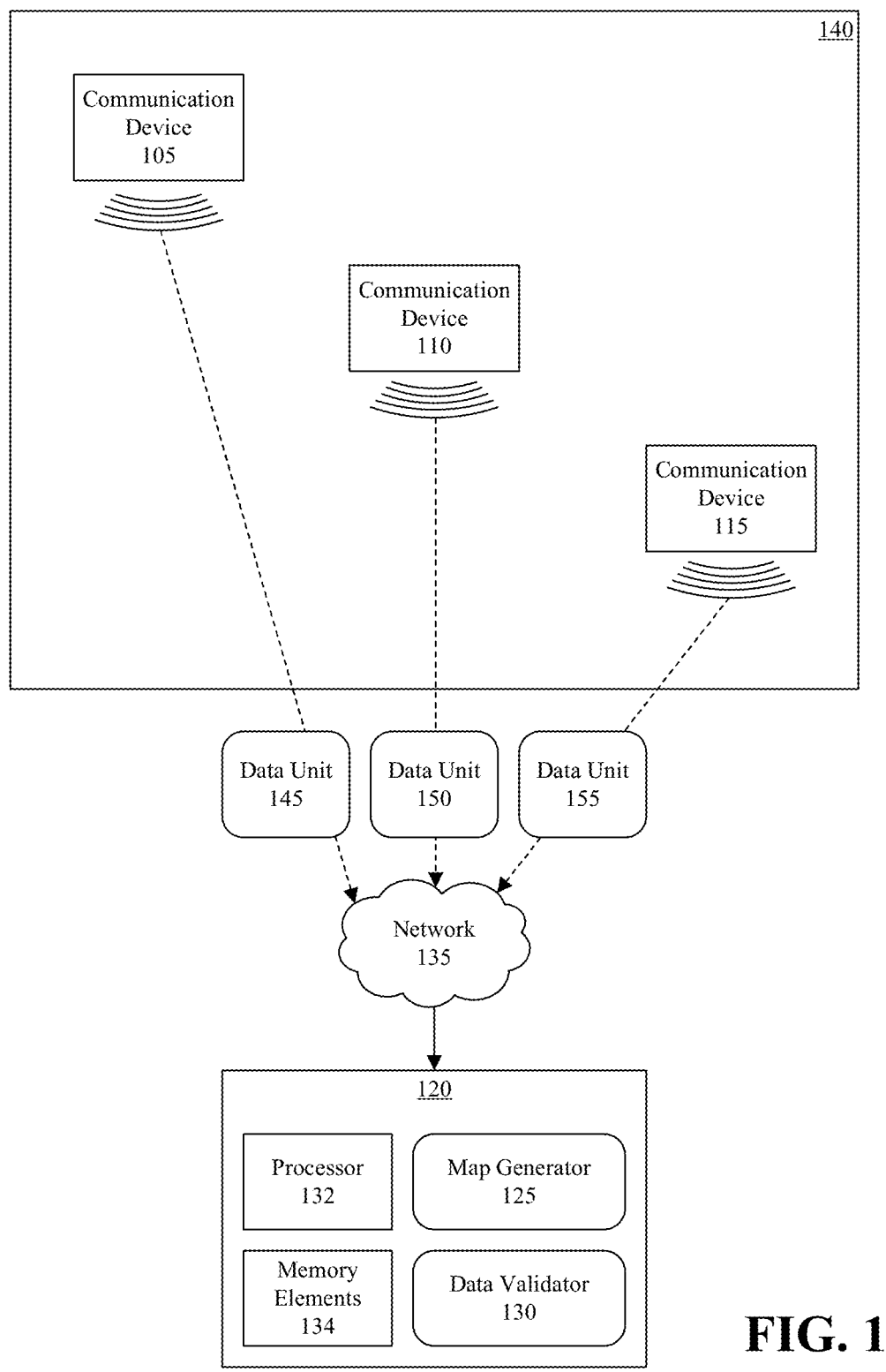
FIG. 1 is a diagram illustrating an exemplary communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to location determination, mapping, and data management through crowdsourcing. In accordance with the inventive arrangements described within this disclosure, crowdsourced data may include different types of data obtained from one or more communication devices of one or more users over time. Using the crowdsourced data, a map of a particular geographic area and/or structure may be generated automatically. The map, for example, may be of the indoor portion of the structure. As defined herein, the term "automatically" means without user intervention. As defined herein, the term "user" means a human being.

Crowdsourced data may include location data obtained from the communication devices. The location data may include estimated locations of user devices determined using pedestrian dead reckoning (PDR) technology implemented within the communication devices. In some cases, the location data may specify Global Positioning System (GPS) data, e.g., coordinates. In another aspect, the crowdsourced data may include radio frequency (RF) data. The RF data may include Wi-Fi data, magnetic field data, or a combination thereof. While Wi-Fi data and magnetic field data have different characteristics, both exhibit relative stability over time.

Crowdsourced data may also be evaluated for purposes of determining validity. Items of crowdsourced data determined to be invalid may not be utilized for purposes of localization and/or mapping. The determination of whether a data item is valid may depend upon a data density. The data density may include a temporal component and/or a spatial component. For example, those data items from an area determined to have greater temporal density and/or greater spatial density may be invalidated at a faster rate than data items from an area of lesser temporal density and/or lesser spatial density.

In one aspect, the inventive arrangements described herein may be implemented as a method or process performed by a data processing system. In another aspect, the inventive arrangements may be implemented as an apparatus such as a data processing system having a processor. The processor, upon executing program code, may perform one or more operations described herein. In still another aspect, the inventive arrangements may be implemented as a non-transitory computer-readable storage medium storing program code that, when executed, causes a processor and/or a system to perform and/or initiate a method or process.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a diagram illustrating an exemplary communication system (system) 100. As pictured, communication system 100 includes one or more communication devices 105, 110, and 115. As defined within this disclosure, the term "communication device" means a device that is capable of communicating with another device over a communication channel. Exemplary communication devices may include, but are not limited to, mobile phones or mobile base stations such as "smart phones," computing devices including Wi-Fi or other wireless transceivers such as tablet computing devices, and the like. The number of communication devices shown in FIG. 1 is for purposes of illustration only and is not intended as a limitation. It should be appreciated that fewer than three communication devices or more than three communication devices may be included within system 100.

In one aspect, each of communication devices 105, 110, and/or 115 may include a pedestrian dead reckoning (PDR) module executing therein. The PDR module, e.g., an application program, may be configured to calculate a current location of the communication device, e.g., a user of the communication device, using a previously determined position or location and advancing the previously determined position or location based upon known or estimated speed over an elapsed time and course. The starting point from which the PDR module may begin operation may be a last reliable location of the communication device prior to determining that the GPS system within the communication device is unable to determine a new or further location of the communication device with an acceptable level of accuracy and/or reliability.

While PDR-based techniques do provide an estimate of location, PDR-based techniques are also subject to a variety of errors. For example, in order to determine accurate location, speed and direction of the entity must be known at each instant in time. This may be problematic since particular assumptions may be made as to length of a user's stride when accelerometer data is used as a pedometer, for example. Further, since each new estimate of location is relative to the prior estimate of location, errors compound over time leading to larger discrepancies between estimated location and actual location of the communication device.

Communication devices 105, 110, and 115 are communicatively linked with a data processing system 120 through a network 135. As defined within this disclosure, the term "data processing system" means a computing system or two or more networked computing systems executing appropriate operational software and one or more applications and/or services. For example, data processing system 120 may be implemented using one or more physical servers, a cloud computing infrastructure, one or more virtual servers executing in one or more physical servers, or combinations thereof.

In one aspect, the term "communication channel" means a particular physical transmission medium such as a wire or an optical cable. In another aspect, the term "communication channel" means a particular logical connection and/or a particular communication protocol. In still another aspect, the term "communication channel" means a particular radio access technology (RAT). Examples of different RATs may include, but are not limited to, Near Field Communications (NFC), Bluetooth, 60 Hz (e.g., over power lines), Wi-Fi (IEEE 802.11x in reference to any of the 802.11 family of communication protocols), Worldwide Interoperability for Microwave Access (WiMax), Long-Term Evolution (LTE), Universal Mobile Telecommunications System (UMTS), Global System for Mobile/General Packet Radio Service (GSM/GPRS), or the like. Appreciably, a "wireless communication channel" generally refers to a particular RAT.

Data processing system (system) 120 may include one or more processors 132 executing one or more applications, services, or other modules of program code. For example, system 120 may include a map generator 125 and a data validator 130. Further, as pictured, system 120 may include one or more memory elements 134 configured to store data received from communication devices 105, 110, and/or 115.

Network 135 is the medium used to provide communications links between various devices and data processing systems connected together within system 100. Network 135 may include connections, such as wire, wireless communication links, or fiber optic cables. Network 135 may be implemented using, or include, any of a variety of different communication technologies such as a Wide Area Network (WAN), a Local Area Network (LAN), a wireless network whether a WAN or a LAN, a mobile network, a Virtual Private Network (VPN), the Internet, the Public Switched Telephone Network (PSTN), or the like.

In the example of FIG. 1, one or more or all of devices 105, 110, and/or 115 may be within a structure 140. Structure 140 may be a building. The building may be for personal or business use. For example, structure 140 may be a business establishment, e.g., an office, a personal dwelling, or the like. Structure 140 is provided for purposes of illustration only and is not intended as a limitation of the inventive arrangements disclosed herein. For example, structure 140 may include multiple floors, a plurality of rooms, hallways, and the like (not shown).

In one aspect, the interior of structure 140 may not be known or mapped. For example, the location of various rooms, routes, points of ingress and/or egress, aisles, and the like may not be known for structure 140. System 120 may receive data units 145, 150, and 155 from communication devices 105, 110, and 115, respectively. Data items included within data units 145, 150, and/or 155 may include any of a variety of data items collected or detected using sensors of communication devices 105, 110, and/or 115, respectively. Exemplary data items may include, but are not limited to, PDR location data, RF data, and a time stamp. In some cases, GPS data may be provided if available. The RF data may include magnetic field magnitude, optionally magnetic field direction (e.g., the individual x, y, and z components of the magnetic field), wireless access point (WAP) names or identifiers (ID), and/or a Received Signal Strength Indicator (RSSI) for the WAP ID.

It should be appreciated that each of communication devices 105, 110, and/or 115 may provide data units periodically, from time-to-time, or the like over a period of time. Thus, while one data unit is shown for each communication device 105, 110, and 115, each communication device 105, 110, and 115 may send a plurality of data units over time. Accordingly, data units 145, 150, and 155 may be processed using processor 132 and/or stored within memory elements 134. System 120 may be configured to determine a map for structure 140. The map may be of the indoor portion of structure 140. For example, the map determined by system 120 may specify one or more routes within structure 140.

As defined within this disclosure, the term "route" means a path that may be traveled or taken by a user. In one aspect, a route may be confined to indoors, e.g., within a structure. An example of a route is a pathway or pathways (e.g., adjoining), connecting rooms, aisles, etc., through which a user may walk. It should be appreciated, however, that a route also may be outdoors.

In another aspect, data received from communication devices 105, 110, and/or 115 may be invalidated at different rates. For example, if data unit 145 is determined by system 120 to be from a region with greater density of data, data unit 145 may be invalidated at a faster rate, e.g., in less time, than data unit 150, which may be from a region with a lesser density of data. Invalid data is not used, e.g., excluded from use, in the map generation process. For regions where new data is expected more often or more frequently, data units may be invalidated at a faster rate thereby preventing the storage of too much data unnecessarily. For regions where new data is expected less often, data may be invalidated at a slower rate to ensure that a sufficient amount of new data is received before invalidating too much data.

In still another aspect, once system 120 generates route(s) and/or a map of structure 140, any further data received from a communication device within structure 140 may be located on the map with respect to one of the routes specified therein. Users of communication devices may be provided with higher quality and higher accuracy location based services when located within a structure such as structure 140.

Figure 2:
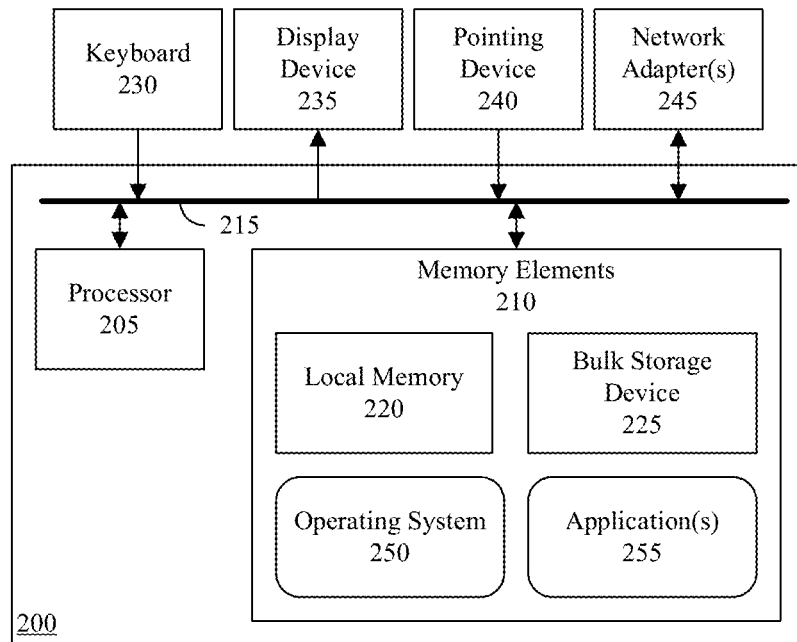
FIG. 2 is an exemplary architecture for a data processing system.

FIG. 2 is an exemplary architecture 200 for a data processing system. In one example, architecture 200 may be used to implement system 120 of FIG. 1. Architecture 200 may also be used to implement any of a variety of systems and/or devices that include a processor and memory and that are capable of performing the operations described within this disclosure. In some cases, the particular device and/or system implemented using architecture 200 may include fewer components or more components than pictured in FIG. 2. Further, the particular operating system and/or application(s) included may vary. For example, architecture 200 may be used to implement a communication device by including appropriate transceivers and/or sensors such as a magnetometer, a mobile operating system, and/or one or more applications, e.g., a PDR application.

As pictured, architecture 200 includes at least one processor 205 coupled to memory elements 210 through a system bus 215 or other suitable circuitry. As defined herein, the term "processor" means at least one hardware circuit (e.g., an integrated circuit) configured to carry out instructions contained in program code. The processor may include one or more cores. Examples of a processor include, but are not limited to, a central processing unit (CPU), an array processor, a vector processor, a digital signal processor (DSP), a field programmable gate array (FPGA), a programmable logic array (PLA), an application specific integrated circuit (ASIC), programmable logic circuitry, and a controller.

Architecture 200 stores program code within memory elements 210. Processor 205 executes the program code accessed from memory elements 210 via system bus 215. Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 may also include one or more cache memories (not shown) that provide temporary storage of at least some program code in order to reduce the number of times program code must be retrieved from bulk storage device 225 during execution.

Input/output (I/O) devices such as a keyboard 230, a display device 235, and a pointing device 240 may optionally be coupled to architecture 200. In some cases, one or more of the I/O devices may be combined. For example, a touchscreen may be used as display device 235, as keyboard 230, and as pointing device 240. The I/O devices may be coupled to architecture 200 either directly or through intervening I/O controllers. One or more network adapters 245 may also be coupled to architecture 200 to enable architecture 200 to become coupled to other systems, computer systems, remote printers, and/or remote storage devices through intervening private or public networks. Modems, cable modems, Ethernet cards, wireless transceivers and/or radios are examples of different types of network adapter 245 that may be used with architecture 200. Depending upon the particular device implemented with architecture 200, the specific type of network adapter, or network adapters as the case may be, will vary.

As pictured in FIG. 2, memory elements 210 store an operating system 250 and one or more applications 255. Applications 255, for example, may include map generator 125 and/or data validator 130. In one aspect, operating system 250 and application(s) 255, being implemented in the form of executable program code, are executed by architecture 200. As such, operating system 250 and application(s) 255 may be considered an integrated part of architecture 200. Operating system 250, application(s) 255, and any data items used, generated, and/or operated upon by architecture 200 are functional data structures that impart functionality when employed as part of a system implemented using architecture 200.

Figure 3:
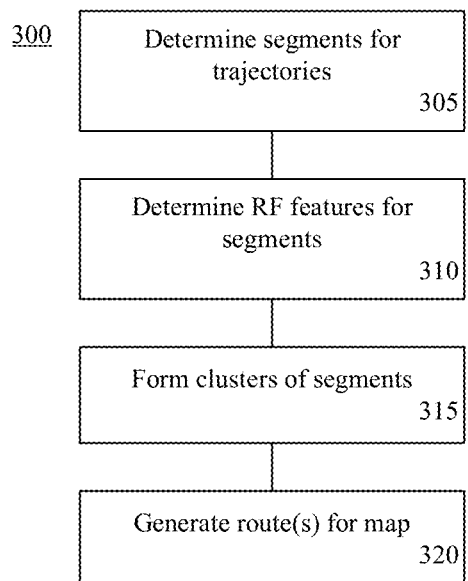
FIG. 3 is a flow chart illustrating an exemplary method of route creation.

FIG. 3 is a flow chart illustrating an exemplary method 300 of route creation. Method 300 may be performed by system 120 of FIG. 1. For example, system 120 may receive data units from one or more communication devices over time. The data units, taken collectively, are crowdsourced data.

In one aspect, the communication devices may be located within a structure such as structure 140. The system may generate routes for a map of the indoors or of an indoor portion of the structure. In another aspect, the communication devices may be located outdoors. The area in which the communication devices are located may be one where real time, variable route(s) may be needed. For example, following an emergency or incident, known routes may be obstructed by debris, damaged, or otherwise unavailable. In that case, the various techniques described herein may be used to determine alternate routes, e.g., evacuation routes. The system may generate routes for a map of an outdoor area.

Method 300 may begin in a state where data items have been collected from one or more different communication devices over time for the structure. In one aspect, a data unit may include one or more data items. Exemplary data items may include PDR location data and RF data. As noted, the RF data may include magnetic field data and Wi-Fi data. In one aspect, PDR location data may specify a two-dimensional coordinate. The communication device, for example, may include a PDR application that utilizes accelerometer data and compass (directional) data available within the communication device to estimate a location as an (x, y) coordinate on a two dimensional coordinate system having an x-axis and a y-axis, where the x-axis and y-axis are perpendicular to one another. Wi-Fi data may include a WAP ID and a corresponding RSSI. Magnetic field data may include magnetic field magnitude and optionally magnetic field directional data.

The data units, e.g., RF data units, taken collectively, specify one or more trajectories. A trajectory $T_i$ may be defined by $T_{i,pdr}$ representing a time series of two-dimensional points (e.g., the PDR location data) for a given communication device, e.g., $\{t, x, y\}$ and $T_{i,rf}$ representing a time series of RF data, e.g., $\{t, rf\}$. In one aspect, $T_{i,rf}$ may be formed of $T_{i,mag}$ representing a time series of magnetic field magnitudes, e.g., $\{t, m\}$, and optionally magnetic field directions, and $T_{i,wifi}$ representing a time series of detected WAP IDs and corresponding RSSIs, e.g., $\{t, WAPID, RSSI\}$.

Method 300 may begin in block 305 where the system determines segments for the trajectories. In one example, the segments may be linear. The system breaks each trajectory $T_{i,pdr}$ of a user into one or more segments. In one aspect, the system determines segments of the trajectories by applying a curvature change detection technique to the two-dimensional points of the PDR data for each trajectory. For example, the curvature change detection technique may utilize, for each trajectory $T_i$, the $T_{i,pdr}$ for determining segments of the trajectory. In determining the segments for each trajectory, it should be appreciated that the segments are implicitly ordered within each respective trajectory. Successive segments may be identified as "simply connected" in the case where a simple turn connects the two segments. In other cases, for example, where a user enters a store at a first location and emerges from the store at another location between two segments, the segments may be said to be "not simply connected."

In block 310, the system determines RF features for the segments. Determining RF features may include determining Wi-Fi features for the segments, determining magnetic field features for the segments, or determining both Wi-Fi features and magnetic field features for the segments. For each segment, the system determines one or more RF features as discussed.

In block 315, the system forms clusters of segments. The system identifies segments that are considered similar to one another. The system forms groups of segments called clusters where each segment in a cluster is similar to each other segment in the cluster based upon a comparison of the RF features.

In block 320, the system generates one or more routes for a map from the clusters determined in block 315. In one aspect, the map is a segment graph specifying one or more routes. The routes are pathways that may be traversed by a user. In another aspect, the routes may be determined using one or more segment trees to be described herein in further detail.

In some cases, the resulting map may be converted into global GPS coordinates by correlating one or more points of the resulting map with one or more known GPS coordinates. For example, ingress and/or egress points for which GPS coordinates may be known may be correlated with points on the map so that the map may be aligned and/or translated, as the case may be, into GPS coordinates.

Figures 4, 5:
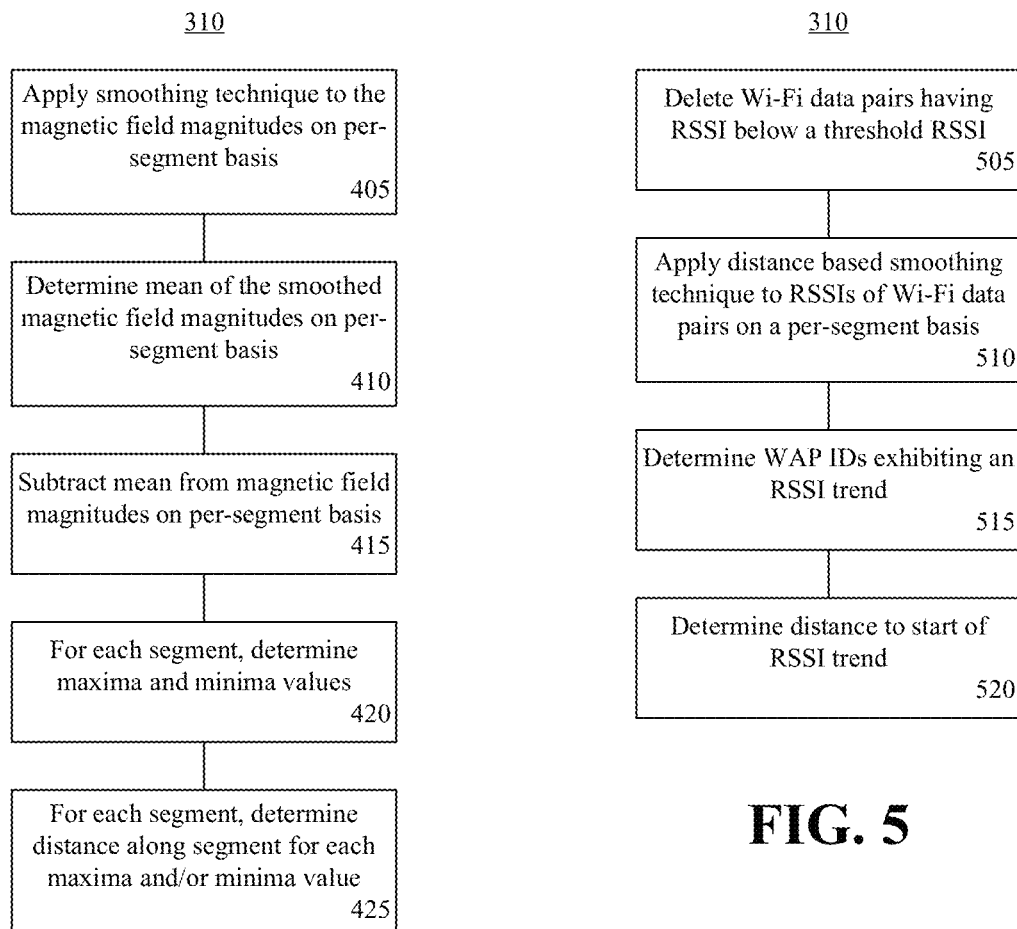
FIG. 4 is a flow chart illustrating an exemplary method of determining radio frequency (RF) features for segments.
FIG. 5 is a flow chart illustrating another exemplary method of determining RF features for segments.

FIG. 4 is a flow chart illustrating an exemplary method of determining RF features for the segments as described with reference to block 310 of FIG. 3. FIG. 4 is directed to determining magnetic field features.

In block 405, the system may apply a smoothing technique to the magnetic field magnitudes. An exemplary smoothing technique may be "simple averaging using a time based window" where values close in time to each other are weighed and averaged. The smoothing technique may be applied on a per segment basis. In block 410, the system may determine a mean of the smoothed magnetic field magnitudes. The mean may be determined on a per segment basis. In block 415, the system may subtract the mean from each magnetic field magnitude. Bock 415 also may be applied on a per segment basis. As such, the mean for a given segment is subtracted from the smoothed magnetic field magnitudes for the segment.

In block 420, for each segment, the system determines maxima (i.e., peaks) and/or minima (i.e., valleys) values along the smoothed magnetic field. In block 425, the system may determine, or calculate, the distance from an end of the segment, e.g., a same reference end of the segment for each distance calculation, to the location of each maxima and/or minima. Thus, in this example, a magnetic field feature is a sequence of one or more pairs of a distance and a corresponding maxima or minima.

FIG. 5 is a flow chart illustrating another exemplary method of determining RF features for the segments as described with reference to block 310 of FIG. 3. FIG. 5 is directed to determining Wi-Fi features.

In block 505, the system may delete Wi-Fi data pairs (e.g., WAP ID and RSSI pairs) that have an RSSI below a threshold RSSI. In block 510, the system may apply a distance based smoothing technique to the RSSIs on a per segment basis. An example of a smoothing technique may include, but is not limited to, "simple averaging using a distance based window" where RSSI values that are close to each other in distance are weighed and averaged on a per WAP ID basis. In one example, the distance may be 5 meters or less, though this value is intended for purposes of illustration only and not limitation.

In block 515, the system may determine WAP IDs exhibiting RSSI trends along each segment. Exemplary trends may include, but are not limited to, up, down, minima, maxima, etc. As defined within this specification, the term "trend" means one or more Wi-Fi data pairs for a segment where the RSSI, when plotted, has at least a positive minimum slope for an "up" trend, less than a negative minimum slope for a "down" trend, defines a minima, or defines a maxima. In block 520, for each segment, the system determines a distance from the end of the segment, e.g., a same reference end, to a start of each trend. Thus, in this example, a Wi-Fi feature is a sequence of one or more WAP IDs, corresponding trends for a segment, and a location for the start of each trend, e.g., the "trend location."

It should be appreciated that while FIGS. 4 and 5 are described independently, both may be applied to determine RF features for a segment and used in combination as previously noted. For example, unlike Wi-Fi data, magnetic field data suffers from global ambiguity in that two or more global locations may have same or indistinguishable magnetic field data. As such, the union of Wi-Fi data and magnetic field data may be particularly effective for purposes of location determination and/or mapping, whether indoor or outdoor.

Figure 6:
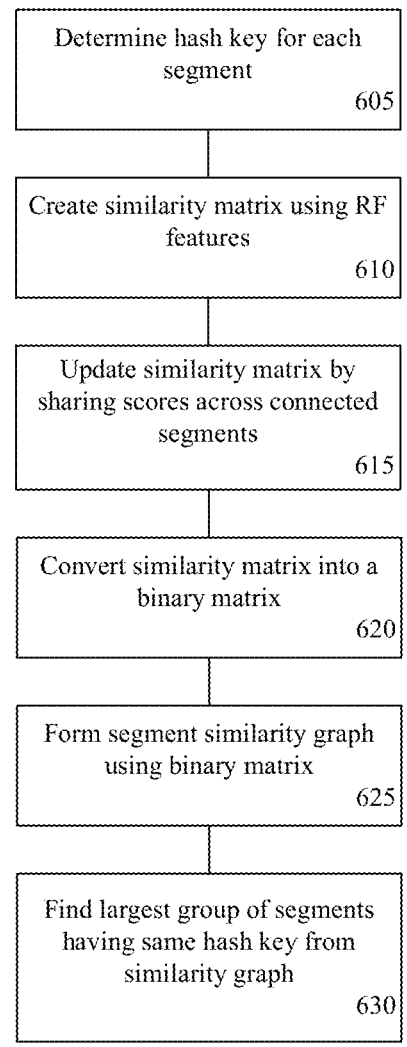
FIG. 6 is a flow chart illustrating an exemplary method of forming clusters of segments.

FIG. 6 is a flow chart illustrating an exemplary method of forming clusters of segments as described with reference to block 315 of FIG. 3. In block 605, the system may determine a hash key for each segment. In one example, the system may use the most frequently observed WAP ID for each segment as the hash key. In another example, the hash key may be generated based upon the length of the segment. Segments with different lengths, e.g., that differ by more than a predetermined amount, are considered to represent different routes. The hash key allows the system to efficiently rule out more obvious pairs of non-matching segments. For example, the system may determine that two segments are not considered similar if the two segments do not have a same hash key.

In block 610 the system may create a similarity matrix using the RF features. In one aspect, the similarity matrix may be formed using only Wi-Fi features. In another aspect, the similarity matrix may be formed using only magnetic field features. In still another aspect, the similarity matrix may be formed using both Wi-Fi features and magnetic field features. The similarity matrix, denoted as SIM, may be calculated for all segments using similarity of the selected RF features between two segments.

For example, in the case where both Wi-Fi features and magnetic field features are used, the similarity matrix may be defined as SIM[(i, j), (k, l)]=Joint Wi-Fi and Magnetic similarity score between segments $S_{ij}$ and $S_{kl}$. In one aspect, two scores may be stored with the other score being the similarity matrix where one of the segments is reversed. The calculation may be a sparse matrix computation in the case where the hash keys previously discussed are included or taken into account.

In block 615, the system may update the similarity matrix by sharing scores across connected segments. In one aspect, for each non zero entry in the similarity matrix, the downstream and upstream neighbors of both segments that result in an entry are identified. The upstream and downstream neighbors are the segments connected to each respective end of a segment. In illustration, for a segment (i, j), the neighbors are (i, j−1), (i, j−2), . . . , (i, 0) and (i, j+1), (i, j+2), . . . , (i, Mi). The system may replace SIM[(i, j), (k, l)] by the sum of similarity scores between the neighbors of the two segments. For example, the system may calculate SIM[(i, j), (k, l)]=sum_over_valid_n (SIM[(i, j−n), (k, l−n)])+sum_over_valid_n (SIM[(i, j+n), (k,l+n)]).

In block 620, the system may convert the similarity matrix into a binary matrix. In one aspect, the similarity matrix may be converted into a binary matrix using a threshold score. In block 625, the system may form a segment similarity graph using the binary matrix. For example, the segment similarity graph may be generated by representing segments as nodes and observing the requirement that an edge exists between two nodes A and B iff SIM(A, B)=1.

In block 630, the system may find the largest group of segments having a same hash key from the similarity graph. The system may apply a similarity matrix computation to derive a cluster of segments. The cluster of segments represents a set of segments that are all similar to each other or are similar to most other segments in the set. In one example, the similarity matrix computation may be performed using Density-Based Spatial Clustering of Applications with Noise (DBSCAN) or density-based clustering. Using the similarity matrix, the system may determine that segments found to be similar to each other are considered connected and are used to derive a large, or larger, set of connected segments, e.g., a clique.

Figure 7:
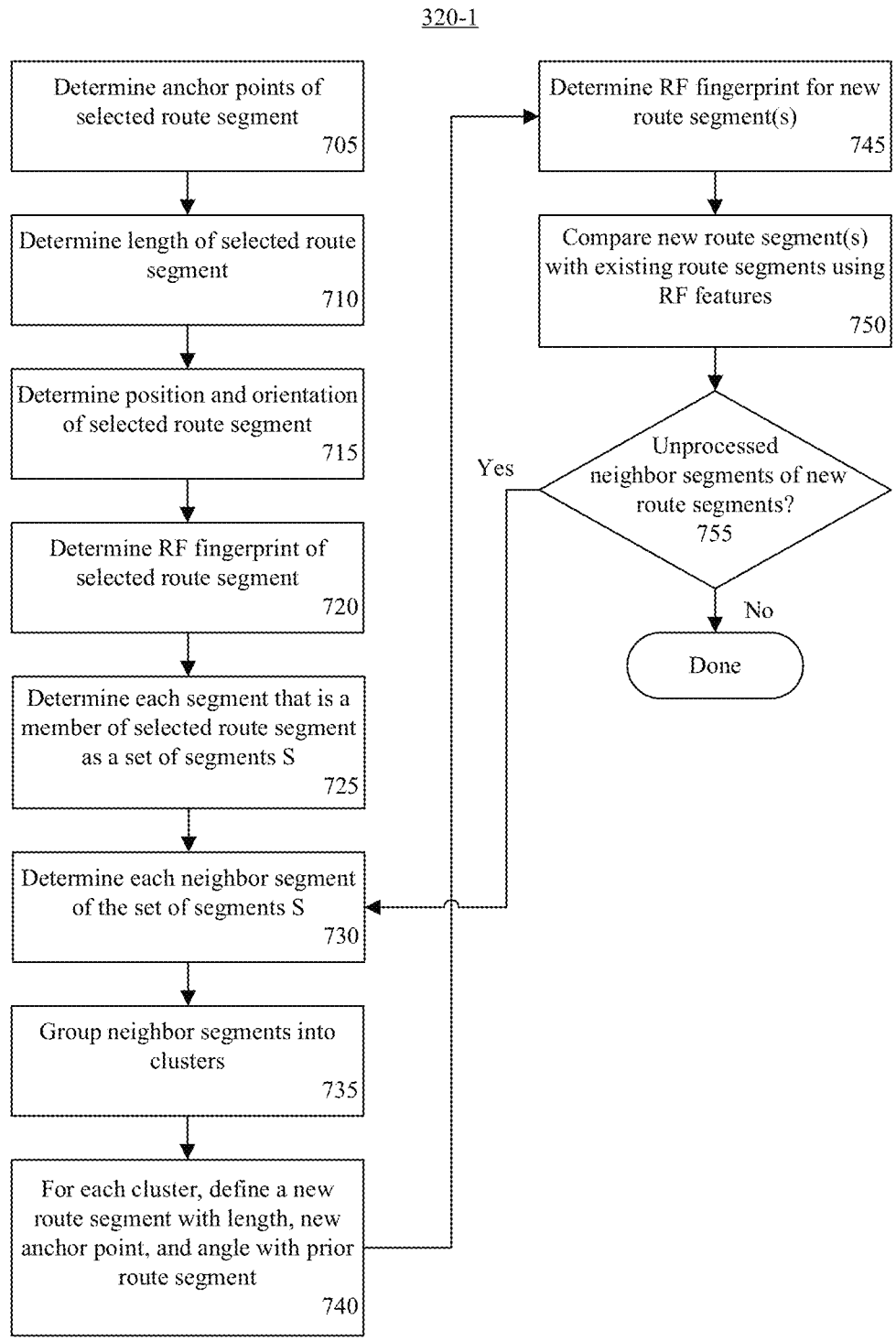
FIG. 7 is a flow chart illustrating a first exemplary aspect of generating routes for a map.

FIG. 7 is a flow chart illustrating a first exemplary aspect of generating routes for a map. In one embodiment, as part of route generation for a map, the system may determine segment trees representing routes from the clusters. For example, the system may identify anchor points forming endpoints of segments for each cluster, determine distances between anchor points by calculating the length of segments in each cluster, and determine coordinates of anchor points in order to derive the segment trees. In this regard, FIG. 7 illustrates a method of determining segment trees that may be performed as a first aspect of block 320 of FIG. 3 (labeled as 320-1 in FIG. 7).

In FIG. 7, the system may begin operating in a state where the largest cluster identified as described in FIG. 6 is chosen as the selected route segment. In general, the set of segments of a cluster represents a "route segment." The individual segments, however, must be merged or combined so that the endpoints of the route segment may be specified. As defined within this disclosure, the term "route segment" is a cluster of segments representing a physical route or pathway. The physical route may be within the interior of a structure, outdoors, etc. Individual route segments may be strung or connected together to form segment trees.

Accordingly, in block 705, the system determines two anchor points, e.g., anchor points A0 and A1, of the selected route segment. For purposes of discussion, the selected route segment may be denoted as H0 and, at least initially, is the largest cluster. The anchor points are endpoints of the selected route segment. In block 710, the system may determine the length of the selected route segment as the median length of segments of the cluster. In block 715, the system may choose or determine the position and orientation of the selected route segment. The position and orientation of the selected route segment may be chosen arbitrarily. Each other route segment connecting to the selected route segment will have a position and orientation relative to the selected route segment. Subsequently, when the segment trees are merged to form the map, the resulting structure may be correlated to one or more known points of entry and/or egress in order to re-orient and/or reposition the resulting map with known coordinates, e.g., GPS coordinates.

In block 720, the system may determine an RF fingerprint of the selected route segment by combining the RF features of the participating segments. The RF features that are combined to form the RF signature depend upon the implementation and may be only Wi-Fi features, only magnetic field features, or both Wi-Fi features and magnetic field features. The RF features for a route segment may be the union of RF features from the member segments of the cluster.

In block 725, the system determines each neighbor segment of a segment that is a member of the cluster specifying the selected route segment. For example, if the segments of the cluster representing the selected route segment are referred to as segment set S, the neighbor segment of each segment in segment set S is determined. As discussed, the segments have an inherent order set by the initial PDR trajectory data. A segment may have a neighbor on each of two endpoints, on one endpoint, or no neighbors. In block 735, the system groups neighbor segments into clusters. Neighbor segments may be grouped into clusters using the clustering technique described within this disclosure.

In block 740, for each cluster identified in block 735, the system defines a new route segment. The system further, for each new route segment defined in block 740, determines a length for the route segment as described, a new anchor point (since one anchor point is shared with the prior neighbor route segment), and an angle with the prior route segment. In block 745, the system determines an RF fingerprint for the new route segment(s) as described.

In block 750, the system may compare the new route segment(s) with existing route segments using the RF features. If a matching route segment is found for any of the new route segments, the system stores an association between the two matching route segments within an association matrix. Associations between route segments may be used to segment trees to form a complete route graph, e.g., map with routes. For example, if a segment appears in multiple segment trees, the system may use the information to determine how to rotate, translate, and merge the segment trees correctly.

In block 755, the system determines whether any unprocessed neighbor segments for new route segments defined in block 740 remain to be processed. If so, the method loops back to block 730 to continue processing neighbor segments to continue growing the segment tree. If no further unprocessed neighbor segments remain to be processed, the method ends.

It should be appreciated that the method illustrated in FIG. 7 is iterated or performed for each cluster. The clusters may be processed in decreasing size order. Thus, after completing multiple iterations of FIG. 7, the system has generated a plurality of different segment tress.

Figure 8:
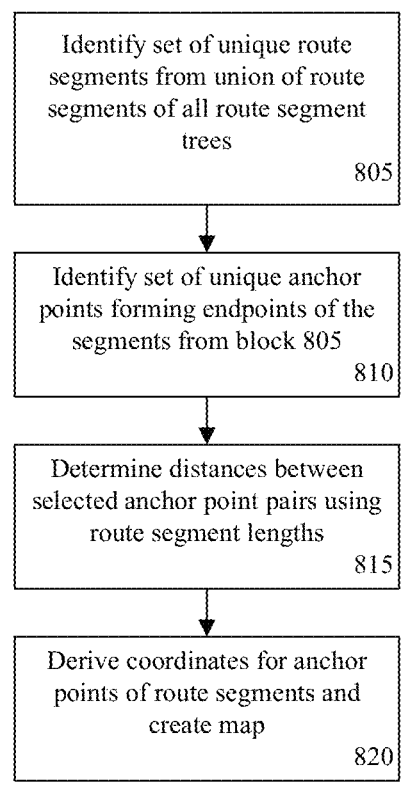
FIG. 8 is a flow chart illustrating a second exemplary aspect of generating routes for a map.

FIG. 8 is a flow chart illustrating a second exemplary aspect of generating routes for a map. FIG. 8 illustrates an exemplary method that may be performed as part of block 320 of FIG. 3, and labeled as 320-2.

In FIG. 8, the system is operating in a state where a plurality of segment trees have been formed as described. In block 805, the system identifies the set of unique route segments from the union of route segments of all segment trees. In block 810, the system identifies the set of unique anchor points forming the endpoints of the segments identified in block 805. In block 815, the system determines distances between selected anchor point pairs based upon route segment lengths.

In block 820, the system derives coordinates for the anchor points of route segments and, using the derived coordinates, creates the map, e.g., a route segment graph. In one aspect, block 820 may be implemented using a global optimization/node embedding technique on the anchor points and segments to obtain the coordinates of anchor points. An exemplary global optimization/node embedding technique may be Dabek et al., "Vivaldi: A Decentralized Network Coordinate System."

It should be appreciated that any of a variety of different techniques may be used and that the examples provided herein are not intended as limitations of the inventive arrangements described. For instance, a global kinematics technique may be used in place of a global optimization/node embedding technique. In a kinematics based approach, at each step of tree formation, the system may determine whether the new route segment matches and/or overlaps with an existing route segment. If so, the matching and/or overlapping route segments are merged and angles between route segments are adjusted according to the merger. For example, angles of connecting route segments are adjusted so that two overlapping route segments overlap completely.

Figure 9:
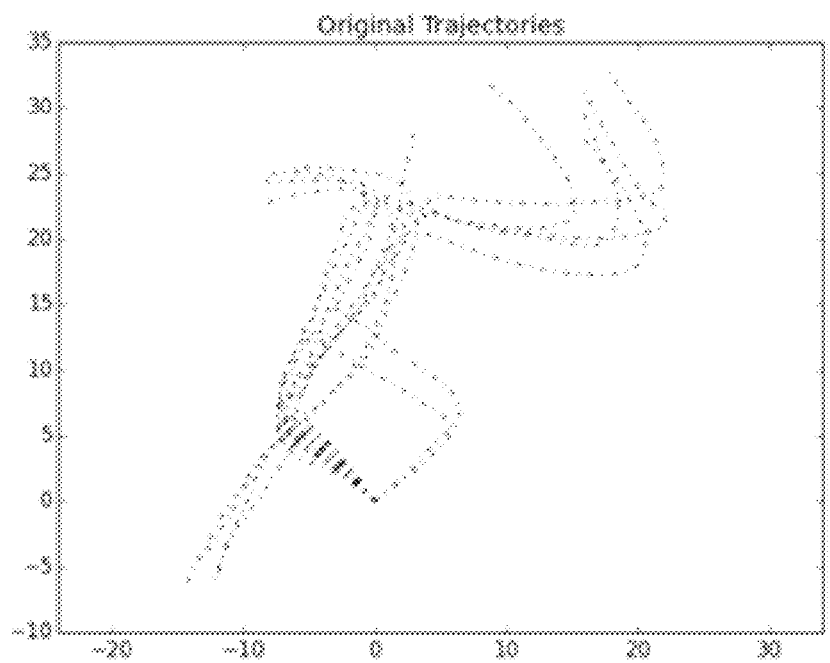
FIG. 9 is a graph illustrating a plurality of exemplary pedestrian dead reckoning (PDR) trajectories.

FIG. 9 is a graph illustrating a plurality of exemplary PDR trajectories. The exemplary PDR trajectories may be operated upon by the system as described with reference to block 305 of FIG. 3.

Figure 10:
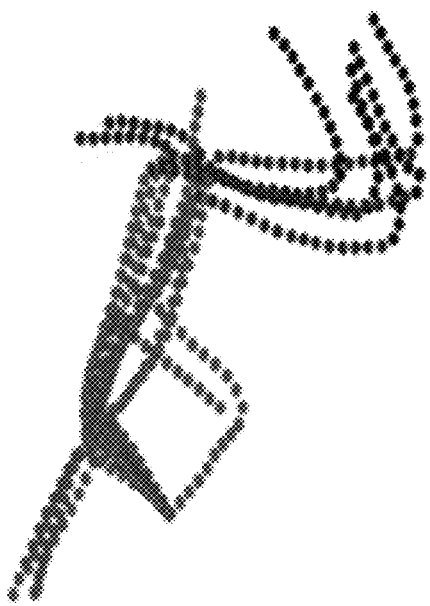
FIG. 10 is a graph illustrating the determination of segments from exemplary PDR trajectories.

FIG. 10 is a graph illustrating the determination of segments from the exemplary PDR trajectories of FIG. 9 as described with reference to block 305 of FIG. 3.

Figure 11:
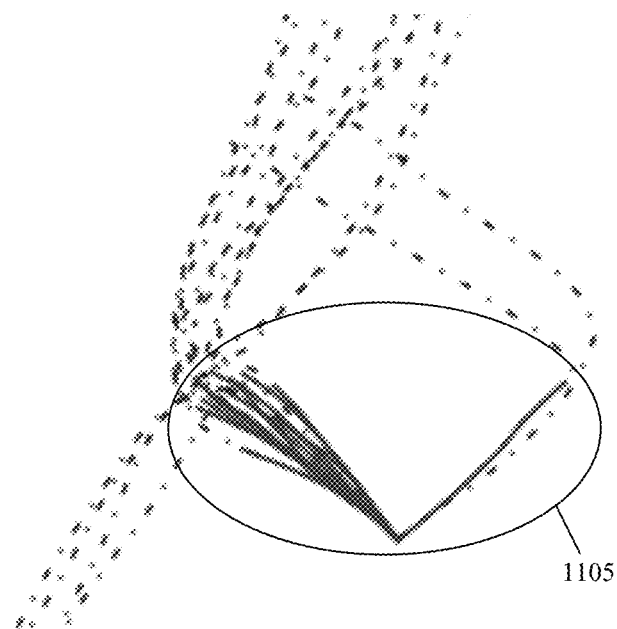
FIG. 11 is a graph illustrating formation of a cluster from a plurality of segments.

FIG. 11 is a graph illustrating the formation of a cluster from a plurality of segments as described with reference to block 315 of FIG. 3. FIG. 11 illustrates the formation of a cluster. The cluster is shown within bounding oval 1105 and is formed of solid lines. For example, the cluster may be an initial or first cluster that includes each of the solid segments within bounding oval 1105. Segments of the cluster may be oriented differently due to wrong and/or arbitrary orientations within the raw PDR traces.

Figure 12:
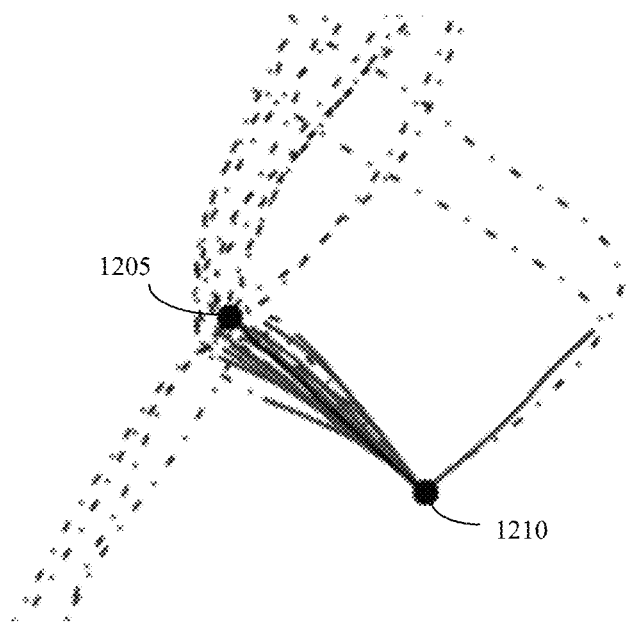
FIG. 12 is a graph illustrating the determination of anchor points and route segment length.

FIG. 12 is a graph illustrating the determination of anchor points and route segment length as described with reference to block 315 of FIG. 3. Anchor points 1205 and 1210 are shown for the identified cluster.

Figures 13, 14:
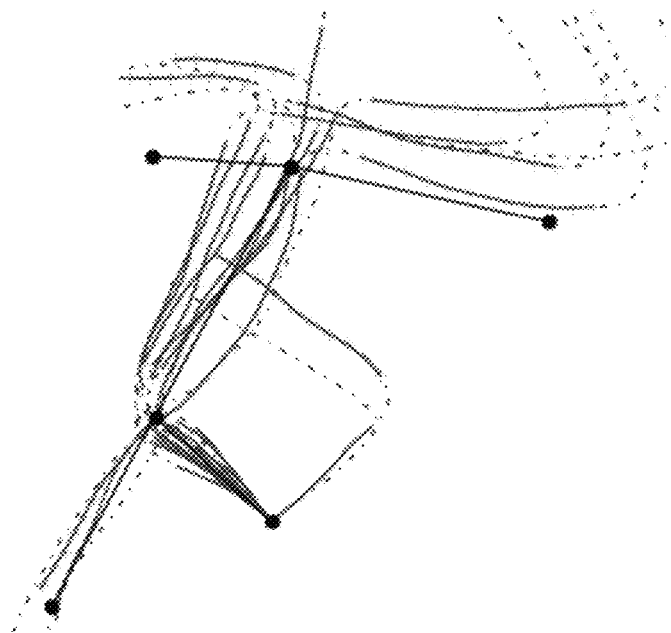
FIG. 13 is a graph illustrating the determination of segment trees.
FIG. 14 is a graph illustrating the generation of routes for a map.

FIG. 13 is a graph illustrating the determination of segment trees as described with reference FIG. 7.

FIG. 14 is a graph illustrating the generation of route(s) for a map as described with reference to block 320 of FIG. 3.

Figure 15:
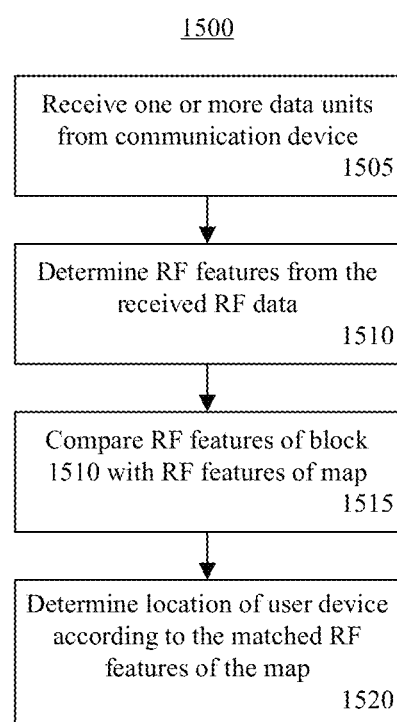
FIG. 15 is a flow chart illustrating an exemplary method of performing localization.

FIG. 15 is a flow chart illustrating an exemplary method 1500 of performing localization. Method 1500 may be performed by a system as described with reference to FIGS. 1 and 2. In one aspect, method 1500 may be performed using a routes of a map generated as described herein with reference to FIG. 3.

In block 1505, the system receives one or more data units, e.g., RF data units, from a communication device. The communication device may be located indoors such as within structure 140, or outdoors. The received data units may include PDR location data and RF data. The RF data may include Wi-Fi data and/or magnetic field data. Each data unit further may include a time stamp.

In block 1510, the system may determine RF features from the received data units. For example, the system may determine Wi-Fi features from the received data units, magnetic field features from the received data units, or both Wi-Fi features and magnetic field features from the received data units.

In block 1515, the system may compare the RF features determined in block 1510 with RF features of the map to determine a match. In block 1520, the system determines the location of the user (the user's communication device) according to the matched RF features of the map. The system determines that the communication device of the user is located at a position on the map where the RF features determined from the communication device match those RF features of the map.

Method 1500 may be performed in an iterative manner in order to provide location services to the user. The system may send the location of the communication device and the map to the communication device so that the user may track his or her location indoors.

Figure 16:
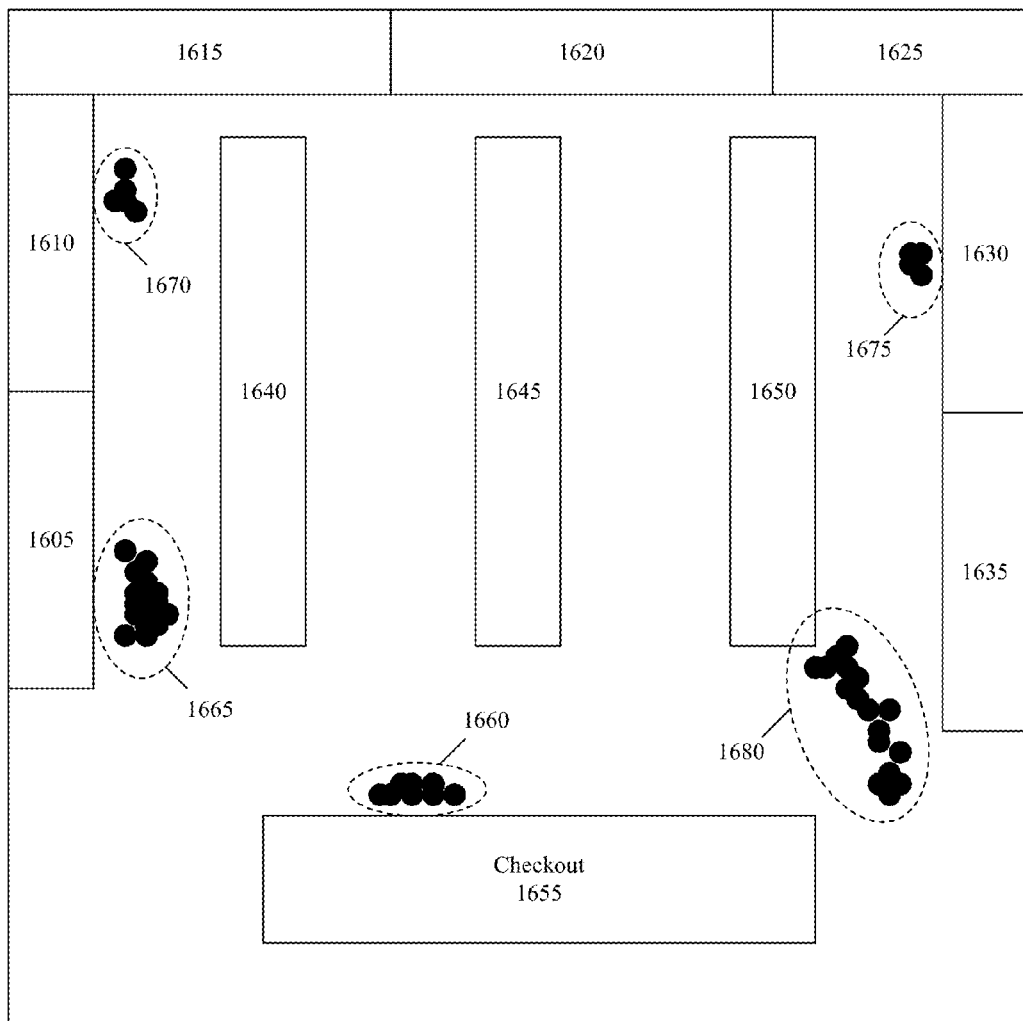
FIG. 16 is a block diagram illustrating a map of an indoor structure.

FIG. 16 is a block diagram illustrating a map 1600 of an indoor structure. Map 1600, for example, may be generated and displayed upon a display device and/or screen of a data processing system to indicate areas of interest and/or points of interest to users. For purposes of illustration, the structure illustrated in map 1600 may be a retail store. The various sections of the structure represent different departments or categories of goods and/or services (hereafter collectively "goods") available for sale to users. For example, each of blocks 1605-1650 may represent a display area or shelving area including goods available to users for purchase. Checkout 1655 represents the area of the structure where users may provide payment for goods being purchased.

Using the PDR data and the RF data described herein, the path taken by users through the structure may be determined. By correlating the path taken by one or more users with map 1600, including the location of goods and/or services for sale, the level of interest of the user in particular items may be determined. Further, since the PDR data and RF data is time stamped, the system may determine the length of time that a user stays in a particular aisle or part of aisle, e.g., a region. Since trajectories and pathways have been illustrated extensively in this disclosure, trajectories and pathways are not illustrated in FIG. 16. FIG. 16, however, does illustrate areas 1660, 1665, 1670, 1675, and 1680 representing regions where users have stayed for at least a minimum amount of time or have visited with greater frequency than other regions.

For example, as the communication device of a user continues to send further PDR and/or RF data, the trajectory information from the communication device may be analyzed, subdivided into segments, and correlated to the indoor map using the RF features described herein. The system may determine, for example, where on a given segment a user stays or lingers based on the time stamped data that is received and the RF feature variation (or lack of variation) over time.

The length of time that a user stays in the same region, e.g., a particular product or category of product, may be used as a measure of interest of the user in that product or category of product. Longer durations indicate higher levels of interest and may be used to create a point of interest on the map. In another example, the system may send messages to the user as part of a location service. The messages may include coupons, advertising, or the like. The particular content of the message may be correlated with the location of the user. For example, responsive to determining that the user has spent at least a minimum amount of time in a particular region for a particular category of product, the system may deliver a coupon or other enticement to purchase a good in the particular category of product where the user is currently located.

It should be appreciated that while FIG. 16 is illustrated using black and white coloration, in another aspect, different colors, patterns, or visual indicators may be used to represent areas where users stayed for different ranges of time or regions visited with greater frequency. Further, pathways taken by users through structure 1600 may be shown. In addition, while FIG. 16 is described with reference to a retail store for purposes of illustration, it should be appreciated that the techniques described within this disclosure may be used for localization of users indoors for any of a variety of structures. The various shelving sections, for example, may be other points of interest in other indoor settings.

While FIG. 16 is described with reference to an indoor setting, it should be appreciated that the techniques described may also be applied to an outdoor setting. For example, the various blocks may represent barriers in an outdoor environment, stands in an outdoor marketplace, or the like.

Figure 17:
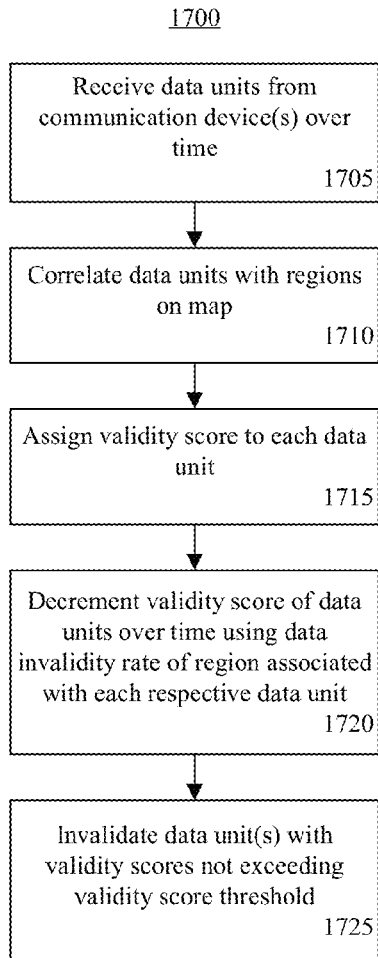
FIG. 17 is an exemplary method of managing data validation.

FIG. 17 is an exemplary method 1700 of managing data validation. Method 1700 may be implemented by a system as described with reference to FIGS. 1 and 2 of this disclosure. In one aspect, method 1700 may be applied to data received in crowdsourced data gathering operations to validate the received data. Data, or data units, that are invalidated are excluded from use, e.g., discarded and/or deleted from the data set, so as not be used for various services. For example, data determined to be invalid using method 1700 may not be used for purposes of determining routes for a map as described with reference to FIG. 3.

The particular type of data that may be validated using the technique illustrated in FIG. 17 may vary. In one aspect, the data received by one or more communication devices of one or more users as part of a crowdsourced map generation and/or user location solution may be validated. In another aspect, crowdsourced data such as ratings relating to points of interests may be validated.

In block 1705, the system may receive data units from one or more communication devices over time. For purposes of discussion in the example of FIG. 17, each data unit may include, or specify, a location, a time stamp, and optionally a data payload. The location may be a GPS coordinate if available, a PDR-based location as discussed herein, or the like. In one exemplary implementation, location may be specified as the WAP ID. The payload may include any of a variety of different data items. Exemplary data items may include RF data as described herein, sensor data from the communication device, user input, application data, or the like.

In block 1710, the system may correlate the data units with regions of a map using the location information. For example, the system determines the particular region of the map from which each received data unit originates. The region from which the data unit originates is then associated with the data unit. The data unit, along with the region association, may be stored in a data structure such as a database or the like.

In accordance with the inventive arrangements disclosed herein, each region of the map may be associated with a data invalidity rate. Thus, each data invalidity rate is region specific. Two or more regions may have same data invalidity rates or different data invalidity rates as determined from the data density of each respective region. A region having a higher data density has a higher data invalidity rate than a region having a lower data density.

Data density of a region may include two components. In particular, data density may include a geographic component and a time component. The geographic component is implemented by using region-specific data invalidity rates. The time component is determined based upon a particular amount of time. For example, data density may be determined for a given region as the number of data items received that originate from that region per unit of time.

In block 1715, the system may assign a validity score to each data unit. The validity score that is assigned may be an initial validity score. In one aspect, since the data invalidity rates may vary from region-to-region according to data density, the validity score assigned to each region may be the same. For purposes of illustration, consider the case where each data unit is assigned an initial validity score of 100. It should be appreciated that the particular number used as the initial validity score may be less than 100 or greater than 100 depending upon the particular implementation of the system.

In block 1720, the system may decrement the validity scores of data units over time. The system may decrement validity scores of data units periodically, from time-to-time, or responsive to particular events that may be detected. When the decrement operation is performed for a data unit, the system determines the particular region associated with the data unit. The system further determines the data invalidity rate of the region associated with the data unit (e.g., the region from which the data unit originates). The system then decrements the validity score of the data unit by the data invalidity rate of the region. It should be appreciated that as data units are received over time, the data density of the regions will vary, thereby causing the data invalidity rates of the regions also to vary over time. Thus, the amount by which a validity score is decremented for a given data unit may also vary over time.

In illustration, consider the case where a first data unit has an initial validity score of 100 and a data invalidation rate of 10. A second data unit may have an initial data validity score of 100 and a data invalidity rate of 20. The two data units are associated with different regions of the map. Responsive to the decrement operation, the system decrements the data validity score of the first data unit to 90. The system decrements the data validity score of the second data unit to 80.

Based upon continued receipt of data units for regions associated with the first and second data units, the data validity rate of the region associated with the first data unit may be increased to 15, while the data validity rate of the region associated with the second data unit may remain unchanged. Accordingly, during the next decrement operation, the system decrements the validity score of the first data unit to 75, while the validity score of the second data unit is decremented to 60.

In block 1725, the system invalidates any data units determined to have a validity score that does not exceed a validity score threshold. In one aspect, the validity score threshold may be set to zero. It should be appreciated that the validity score threshold may be set to any of a variety of values less than zero or greater than zero. Continuing with the example of FIG. 17, the system invalidates any data items found to have a validity score of zero or less. Referring to the examples described within this disclosure, data items that are invalidated may be excluded from use in map generation and/or other localization operations. For example, in invalidating data units, the system may access a storage device storing the data units and delete the invalid data unit from the storage device resulting in different and updated data. In another aspect, valid data units may be stored in one portion of a memory device, while invalid data units are stored in a different portion of a memory device, in a different memory device, or deleted from and/or overwritten in the memory device. For example, data units determined to be invalid may be tagged as invalid to distinguish from valid data units or moved to a particular portion or region of physical memory reserved for invalid data units thereby separating valid data units from invalid data units.

Method 1700 may be performed in an iterative manner for data items. In one aspect, method 1700 may be performed periodically, from time-to-time, or responsive to various events. For example, method 1700 may be performed in a batch mode responsive to receiving a minimum amount or number of data units. In another aspect, method 1700 may be performed iteratively in real time as data units are received.

Figure 18:
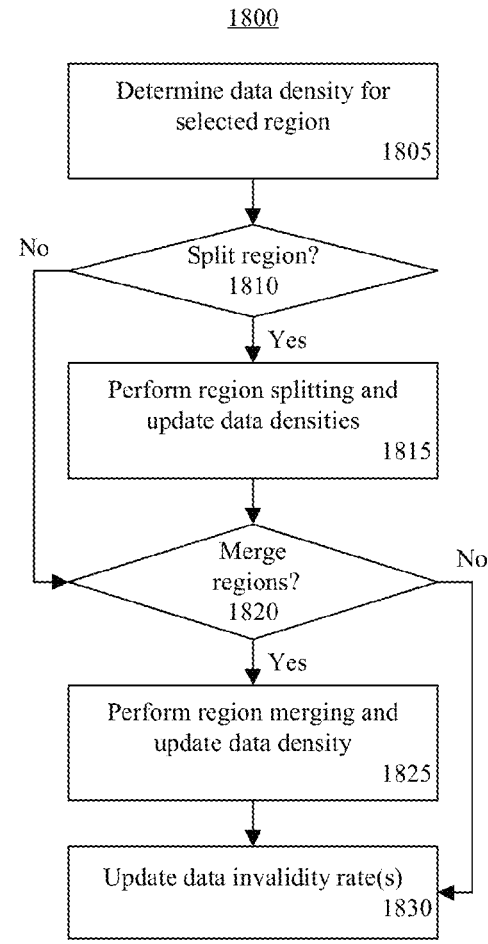
FIG. 18 is an exemplary method of managing regions of a map for data validation.

FIG. 18 is an exemplary method 1800 of managing regions of a map for data validation. Method 1800 may be implemented by a system as described with reference to FIGS. 1 and 2 of this disclosure. Method 1800 illustrates an exemplary technique for updating regions of a map based upon data density. Method 1800 may be performed on a region-by-region basis across regions of the map from time-to-time, periodically, or responsive to a particular event. For example, method 1800 may be performed for a region responsive to one or more data units originating from the region being invalidated. Method 1800 may be performed responsive to receiving at least a minimum amount of data units for a particular region within a defined period of time. It should be appreciated that method 1800 may also be performed concurrently with method 1700 of FIG. 17.

In block 1805, the system determines the data density for a selected region. The data density may be defined as a number of data units received per unit of time with a location within the selected region, where the unit of time is a predefined amount of time. In block 1810, the system determines whether to split the region. For example, the system compares the data density of the selected region with a maximum data density threshold. The system may determine that the selected region should be split into two or more regions responsive to determining that the data density of the region exceeds the maximum data density threshold. If the system determines that the region should be split, method 1800 continues to block 1815. If not, method 1800 continues to block 1820.

In block 1815, the system splits the region into two or more regions. For example, the region may be split in half, into thirds, into quarters, etc. In one aspect, the regions are rectangular in shape. In another aspect, each region is square in shape. In that case, for example, regions are split into quarters where each resulting region from a splitting operation is also square in shape. As part of the region splitting, the system updates the data density for each of the regions resulting from the splitting operation.

In block 1820, the system determines whether the region should be merged with one or more other regions. For example, the system compares the data density of the selected region with a minimum data density threshold. The system may determine that the selected region should be merged with one or more other regions responsive to determining that the data density of the selected region and one or more adjacent regions does not exceed the minimum data density threshold. If the system determines that the region should be merged, method 1800 proceeds to block 1825. If not, method 1800 continues to block 1830.

In block 1825, the system merges the selected region with one or more other regions. In one aspect, the selected region and each other region being merged with the selected region has a data density that does not exceed the minimum data density threshold. Further, each region with which the selected region is being merged may be adjacent to the selected region. In one example, the selected region may be merged with three other regions to maintain square shaped regions. As part of region merging, the system updates the data density of the region resulting from the region merge operation.

In block 1830, the system updates the data invalidity rate(s) for regions processed in the current iteration of method 1800. For example, the system updates the data invalidity rate for any regions resulting from a region split operation, for any regions resulting from a region merge operation, and/or for the selected region if no split or merge operation is performed. As discussed, the data invalidity rates are determined from the data densities. The system may store an expression that, when evaluated using a data density as an input, provides a data invalidity rate as an output. In another aspect, the data invalidity rate may be the data density. In still another aspect, the system may store a table correlating data densities and/or data density ranges with data invalidity rates.

Figure 19:
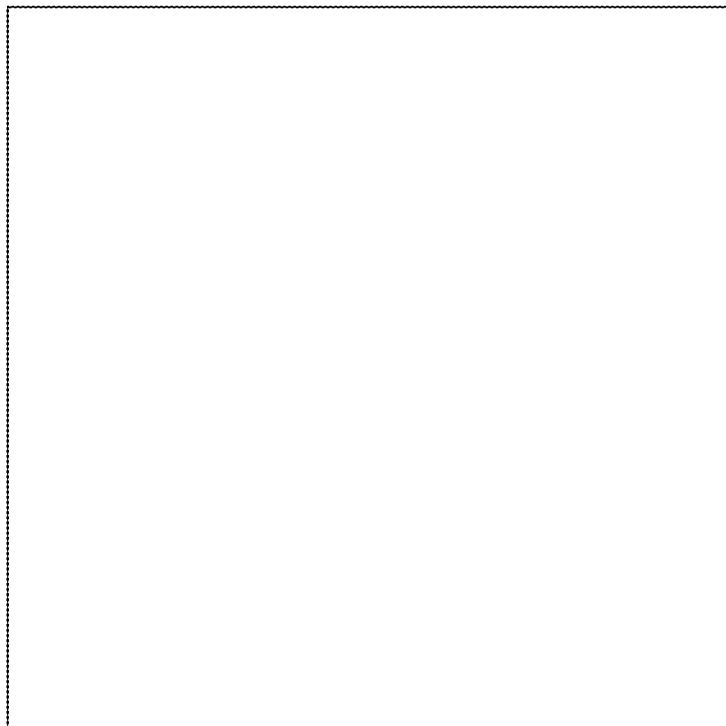
FIG. 19 is a block diagram illustrating an exemplary map for managing data validity.

FIG. 19 is a block diagram illustrating an exemplary map 1900 for managing data validity. FIG. 19 illustrates an initial state of map 1900 prior to creating any regions.

Figure 20:
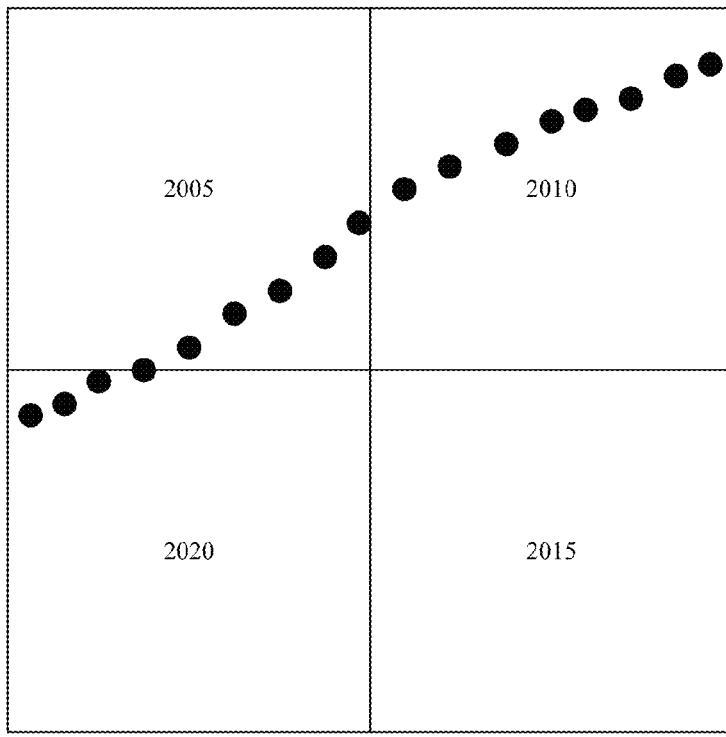
FIG. 20 is a block diagram illustrating the exemplary map of FIG. 19 after receiving data units specifying a trajectory.

FIG. 20 is a block diagram illustrating exemplary map 1900 after receiving data units specifying a trajectory. As pictured, the trajectory progresses through regions 2020, into region 2005, and into region 2010.

Figure 21:
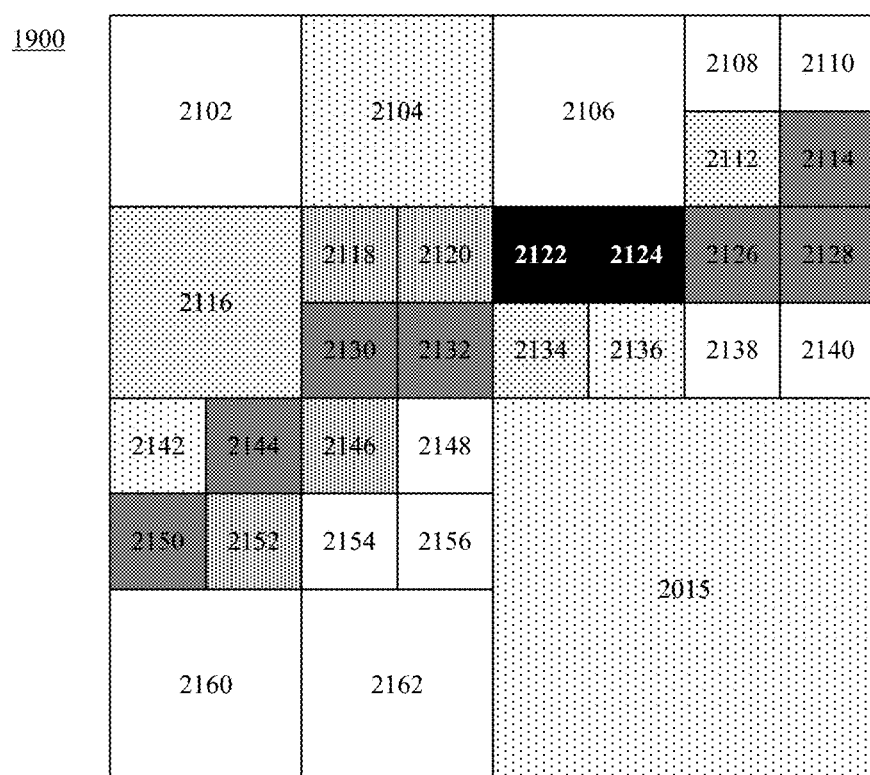
FIG. 21 is a block diagram illustrating the exemplary map of FIG. 19 after receiving a plurality of trajectories.

FIG. 21 is a block diagram illustrating exemplary map 1900 after receiving a plurality of trajectories. Map 1900 may be used as described with reference to FIGS. 17 and 18. As pictured, map 1900 includes a plurality of regions 2102-2162. For purposes of illustration, the amount of shading in each of regions 2102-2162 indicates the data density of the region and, as such, the relative data invalidity rate of the region.

Regions 2122 and 2124, for example, being the darkest, have the highest data density and, as such, the highest data invalidity rate. The data invalidity rate for regions 2122 and 2124 may be set high, e.g., the highest in this example, as described due to the expectation that new data units will arrive for the regions to replace data units that are invalidated. In one aspect, the rate at which data units are invalidated may be matched to the expected rate of incoming data units for a given region.

Regions 2102, 2106, 2108, 2110, 2138, 2140, 2148, 2154, 2156, 2160, and 2162, being the lightest in shade, have the lowest data density. The data invalidity rate of regions 2102, 2106, 2108, 2110, 2138, 2140, 2148, 2154, 2156, 2160, and 2162 is low, e.g., the lowest in this example, due to the expectation that data units arrive at a slower pace or rate for the regions to replace invalidated data units. As noted, in one aspect, the rate at which data units are invalidated may be matched to the expected rate of incoming data units for a given region.

Map 1900 also illustrates exemplary splitting and merging operations. A region such as region 2015 may be split into four regions sized as region 2116. A region such as region 2116 may be split into four regions sized as region 2118. In terms of merging, four regions sized as region 2118 may be merged to form a region sized as region 2116. Four regions sized as region 2116 may be merged to form a region sized as region 2015. As discussed, the data density of a region may be updated dynamically. Regions may be split and/or merged dynamically as data densities of the respective regions continue to change.

Map 1900 is provided for purposes of illustration only. As such, the particular number of regions, size of regions, and/or shape of regions is not intended as a limitation of the inventive arrangements described within this disclosure. As discuss, the data validity management techniques described within this disclosure may be used to process, or preprocess, data units used to create a map.

In another exemplary implementation, a system may receive data units over time, correlate the data units with regions of map 1900 using the location information, and determine data densities for the regions. The system may display the data densities, e.g., on a display device. For example, a view as illustrated in FIG. 21 may be presented upon a display device illustrating data densities of regions and how the data densities change over time.

The data validation techniques described within this disclosure with reference to FIGS. 17-21 may be applied to domains other than geographic data. For example, rather than the location parameter indicating a geographic location, the location parameter may specify a particular category within a plurality of categories, a particular class within a taxonomy, a particular level of a hierarchy of data, etc. The data invalidity rates may be computed according to data densities on a per class basis, a per level basis, or a per category basis.

Accordingly, referring to the foregoing examples, the regions may represent categories, classes of a taxonomy, levels of a hierarchy, etc. The regions may be split and/or joined as described herein subject to availability of further sub-classes, sub-categories, and sub-levels of the hierarchy. Data units of a given class, level, or category may be invalidated, e.g., removed, from the domain responsive to the validity score of the data unit not exceeding the validity score threshold.

In another aspect, the particular parameter used as a proxy for location may be obtained from within the payload of a data unit. For example, the location parameter may indicate similarity between the payload portion of two or more different data units. A similarity threshold may be applied to determine grouping of data units and the number of data units to be included in a group.

In one aspect, the similarity threshold may be increased or decreased in an automatic and dynamic manner to increase or decrease the number of data units included in a group. For example, to decrease the number of data units in a group, the similarity threshold for the group may be increased. Increasing the similarity threshold results in fewer data units being considered similar and grouped together. To increase the number of data units included in a group, the similarity threshold for the group may be decreased. Decreasing the similarity threshold results in more data units being considered similar and grouped together. The number of data units maintained in groups may be maintained within a given range, at a particular number, or the like, by automatically increasing or decreasing the similarity threshold according to the number of data units in a group. Responsive to too many data units in a group, the similarity threshold may be increased. Responsive to too few data units in a group, the similarity threshold may be reduced. Further, groups may be assigned different similarity thresholds. In one aspect, similarity thresholds may be assigned on a per-group basis.

Figure 22:
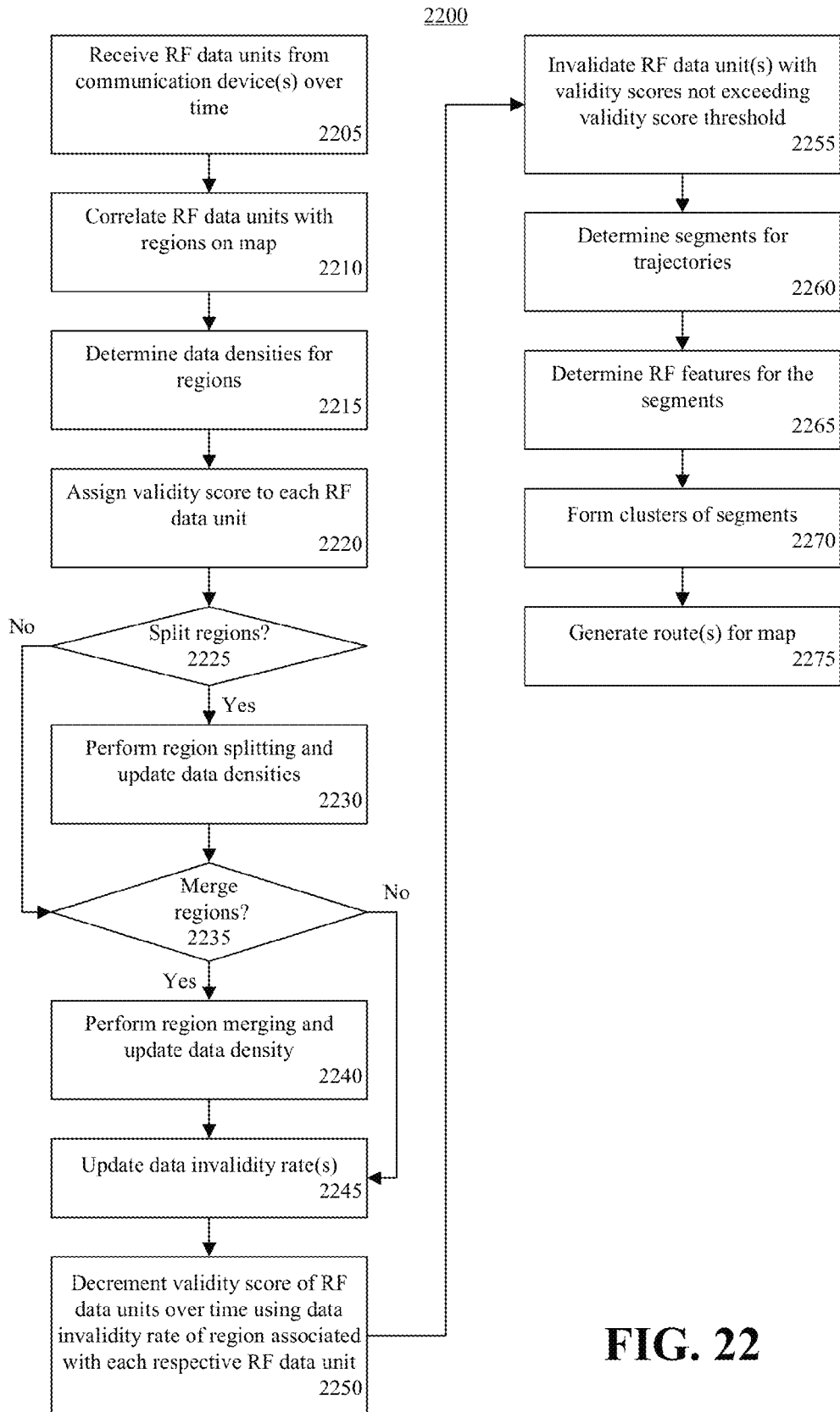
FIG. 22 is a flow chart illustrating an exemplary method of route creation with data validation.

FIG. 22 is a flow chart illustrating an exemplary method 2200 of data management and route generation. Within method 2200, data validation, in reference to blocks 2205-2255, is performed prior to route generation. It should be appreciated, however, that data validation may be performed subsequent to route generation, e.g., prior to a next iteration of route generation and/or updating, responsive to an event such as receiving a predetermined number of data units, periodically, or the like.

In block 2205, the system receives RF data units from communication devices over time. The RF data units specify trajectories for the communication devices. In block 2210, the system correlates RF data units with regions on a map. In one aspect, the map may represent a bounded area, whether indoors or outdoors, that lacks route information. In another aspect, the map may include route information that is to be updated using the route generation techniques described within this disclosure. Regions may be correlated using GPS coordinates, PDR data, WAP ID, or the like. In block 2215, the system determines data densities for regions of the map. In block 2220, the system assigns a validity score to each RF data unit.

In block 2225, the system determines whether to split regions of the map. The system may, on a per region basis, determine whether to split the regions as described herein. If one or more regions are identified for splitting in block 2225, method 2200 continues to block 2230. In block 2230, the system performs region splitting and updates the data densities for any regions identified in block 2225. If no regions are identified for splitting in block 2225, method 2200 continues to block 2235.

In block 2235, the system determines whether to merge regions of the map. If two or more regions are to be merged, as determined in block 2235, method 2200 continues to block 2240. In block 2240, the system merges regions identified in block 2235 and as described herein. If at least two regions are not identified for merging, method 2200 continues to block 2245 where the system updates the data invalidity rate(s) of the regions.

In block 2250, the system decrements the validity scores of data units over time using the data invalidity rate of the region associated with each respective data unit. In block 2255, system invalidates data unit(s) with validity scores that do not exceed the validity score threshold. As discussed, invalidating data units may include deleting the data unit from a storage device storing the data units. In another aspect, the system may move invalid data units from the portion in memory including valid data units to another portion of memory including invalid data units and/or deleted.

Continuing with blocks 2260-2275, the system utilizes only valid RF data units. By restricting the RF data units used to those determined to be valid, up-to-date crowdsourced data is used for purposes of route generation. Using up-to-date data ensures that the routes generated are accurate and in accord with recently received crowdsourced data. Thus, in circumstances where pathways may change rapidly over time, the generated routes reflect the changing circumstances.

In block 2260, the system determines segments for trajectories. As noted, the trajectories are specified by a plurality of RF data units, i.e., only valid RF data units. In block 2265, the system determines RF features for the segments. The system may determine magnetic field features, Wi-Fi features, or both magnetic field and Wi-Fi features. In block 2270, the system forms clusters of the segments. In block 2275, the system generates route(s) for the map. Method 2200 may be repeated continually, from time-to-time, or periodically to manage the RF data units used for route generation and update the routes based upon the valid RF data units.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined within this disclosure, the terms "a" and "an" mean one or more than one. The term "plurality," as defined herein, means two or more than two. The term "another," as defined herein, means at least a second or more. The term "coupled," as defined herein, means connected, whether directly without any intervening elements or indirectly with one or more intervening elements, unless otherwise indicated. Two elements may also be coupled mechanically, electrically, or communicatively linked through a communication channel, pathway, network, or system.

The term "and/or" as defined herein means any and all possible combinations of one or more of the associated listed items. The terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. Although the terms "first," "second," etc. may be used herein to describe various elements, these elements should not be limited by these terms, as these terms are only used to distinguish one element from another unless the context indicates otherwise.

As defined herein, the terms "if," "when," "upon," mean in response to detecting and/or determining or responsive to detecting and/or determining. For example, the phrase "if [a stated condition or event] is detected," means in response to determining and/or detecting [the stated condition or event] ." As defined herein, the terms "in response to" and/or "responsive to" mean responding or reacting readily to an action, event, or condition. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "real time" means a level of processing responsiveness that a user or system senses as sufficiently immediate for a particular process or determination to be made, or that enables the processor to keep up with some external process.

A computer program product may include a computer readable storage medium (or media) having computer readable program instructions thereon for causing a processor to carry out aspects of the present invention. Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language and/or procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the inventive arrangements provided herein is for purposes of illustration and is not intended to be exhaustive or limited to the form and examples disclosed. Modifications and variations may be apparent to those of ordinary skill in the art without departing from the scope and spirit of the described inventive arrangements.

A method may include determining using a processor, segments for a plurality of trajectories, wherein each trajectory includes radio frequency (RF) data from a communication device, determining, using the processor, RF features for the segments, and forming, using the processor, clusters of the segments according to the RF features. The method may also include generating, using the processor, routes for a map using the clusters.

Generating the routes may include generating segment trees from the clusters and generating the map using the segment trees.

In one aspect, the RF data may include Wi-Fi data. The RF features may include Wi-Fi features. For example, one or more or all of the Wi-Fi features may include a WAP ID and a trend for the WAP ID located at a particular distance along one of the segments.

In another aspect, the RF data may include magnetic field data. The RF features may include magnetic field features. For example, one or more or all of the magnetic field features may include a magnetic field magnitude exceeding a threshold magnetic field magnitude located at a particular distance along one of the segments.

In another aspect, the RF data may include Wi-Fi data and magnetic field data. The RF features may include Wi-Fi features and magnetic field features.

The method may include correlating the RF data with regions of the map, adjusting validity scores of units of RF data over time according to a data density of the region correlated with each respective unit of RF data, and using only selected units of the RF data having a validity score exceeding a minimum validity score when determining segments for the plurality of trajectories.

The method further may include determining data invalidity rates for the regions according to the data densities of the regions. Adjusting validity scores may include decrementing the validity scores of the units of RF data over time using the data invalidity rate of the region of the map correlated with each respective unit of RF data.

A system includes a processor programmed to initiate executable operations. The executable operations may include determining segments for a plurality of trajectories, wherein each trajectory includes RF data from a communication device, determining RF features for the segments, and forming clusters of the segments according to the RF features. The executable operations may also include generating routes for a map using the clusters.

Generating the routes may include generating segment trees from the clusters and generating the map using the segment trees.

In one aspect, the RF data may include Wi-Fi data. The RF features may include Wi-Fi features. For example, one or more or all of the Wi-Fi features may include a WAP ID and a trend for the WAP ID located at a particular distance along one of the segments.

In another aspect, the RF data may include magnetic field data. The RF features may include magnetic field features. For example, one or more or all of the magnetic field features may include a magnetic field magnitude exceeding a threshold magnetic field magnitude located at a particular distance along one of the segments.

In another aspect, the RF data may include Wi-Fi data and magnetic field data. The RF features may include Wi-Fi features and magnetic field features.

The executable operations may include correlating the RF data with regions of the map, adjusting validity scores of units of RF data over time according to a data density of the region correlated with each respective unit of RF data, and using only selected units of the RF data having a validity score exceeding a minimum validity score when determining segments for the plurality of trajectories.

The executable operations further may include determining data invalidity rates for the regions according to the data densities of the regions. Adjusting validity scores may include decrementing the validity scores of the units of RF data over time using the data invalidity rate of the region of the map correlated with each respective unit of RF data.

A non-transitory computer-readable storage medium has instructions stored thereon which, when executed by a processor, perform a method. The method may include determining segments for a plurality of trajectories, wherein each trajectory includes RF data from a communication device, determining RF features for the segments, and forming clusters of the segments according to the RF features. The method may also include generating routes for a map using the clusters.

Generating the routes may include generating segment trees from the clusters and generating the map using the segment trees.

In one aspect, the RF data may include Wi-Fi data. The RF features may include Wi-Fi features. For example, one or more or all of the Wi-Fi features may include a WAP ID and a trend for the WAP ID located at a particular distance along one of the segments.

In another aspect, the RF data may include magnetic field data. The RF features may include magnetic field features. For example, one or more or all of the magnetic field features may include a magnetic field magnitude exceeding a threshold magnetic field magnitude located at a particular distance along one of the segments.

In another aspect, the RF data may include Wi-Fi data and magnetic field data. The RF features may include Wi-Fi features and magnetic field features.

The method may include correlating the RF data with regions of the map, adjusting validity scores of units of RF data over time according to a data density of the region correlated with each respective unit of RF data, and using only selected units of the RF data having a validity score exceeding a minimum validity score when determining segments for the plurality of trajectories.

The method further may include determining data invalidity rates for the regions according to the data densities of the regions. Adjusting validity scores may include decrementing the validity scores of the units of RF data over time using the data invalidity rate of the region of the map correlated with each respective unit of RF data.

A method may include receiving, using a processor, data units from a plurality of communication devices over time, wherein each data unit includes location information, correlating, using the processor, the data units with regions of a map using the location information, and determining, using the processor, data densities for regions, wherein a data density specifies a number of data units received from the region over a period of time. The method also includes presenting, using the processor, an indicator of data density of the regions.

The method may include adjusting a validity score of a selected data unit over time according to the data density of the region correlated with the selected data unit and invalidating the selected data unit responsive to determining that a validity score of the selected data unit does not exceed a minimum validity score.

The method may include assigning, to each data unit, a validity score that is region specific, determining data invalidity rates for the regions of the map, and decrementing validity scores of the data units over time using the data invalidity rate of the region of the map correlated with each respective data unit. The method further may include invalidating data units responsive to determining that validity scores of the data units do not exceed a minimum validity score.

In one aspect, the method may include subdividing a region into a plurality of smaller regions responsive to determining that the region has a data density exceeding a data density threshold.

In another aspect, the method may include merging a plurality of selected regions into a single, larger region responsive to determining that the data density for each of the plurality of selected regions is below a data density threshold, wherein each of the plurality of selected regions is adjacent to at least one other one of the plurality of selected regions.

The method also may include updating the data invalidity rate of a region of the map according to the data density of the region over time.

A system includes a processor programmed to initiate executable operations. The executable operations may include receiving data units from a plurality of communication devices over time, wherein each data unit includes location information, correlating the data units with regions of a map using the location information, and determining data densities for regions, wherein a data density specifies a number of data units received from the region over a period of time. The executable operations may also include presenting an indicator of data density of the regions.

The executable operations may include adjusting a validity score of a selected data unit over time according to the data density of the region correlated with the selected data unit and invalidating the selected data unit responsive to determining that a validity score of the selected data unit does not exceed a minimum validity score.

The executable operations may include assigning, to each data unit, a validity score that is region specific, determining data invalidity rates for the regions of the map, and decrementing validity scores of the data units over time using the data invalidity rate of the region of the map correlated with each respective data unit. The method further may include invalidating data units responsive to determining that validity scores of the data units do not exceed a minimum validity score.

In one aspect, the executable operations may include subdividing a region into a plurality of smaller regions responsive to determining that the region has a data density exceeding a data density threshold.

In another aspect, the executable operations may include merging a plurality of selected regions into a single, larger region responsive to determining that the data density for each of the plurality of selected regions is below a data density threshold, wherein each of the plurality of selected regions is adjacent to at least one other one of the plurality of selected regions.

The executable operations may also include updating the data invalidity rate of a region of the map according to the data density of the region over time.

The terminology used herein was chosen to explain the principles of the inventive arrangements, the practical application or technical improvement over technologies found in the marketplace, and/or to enable others of ordinary skill in the art to understand the embodiments disclosed herein.

What is claimed is:

1. A method, comprising:
   receiving, using a processor, data units from a plurality of communication devices over time, wherein each data unit comprises location information;
   correlating, using the processor, the data units with regions of a map using the location information;
   assigning, to each data unit, a validity score;
   for each data unit, decrementing the validity score of the data unit over time according to a region specific invalidity rate for the region correlated with the data unit;
   invaliding each data unit responsive to determining that the validity score of the data unit does not exceed a minimum validity score;
   determining, using the processor, data densities for regions, wherein a data density specifies a number of data units received from the region over a period of time; and
   presenting, using the processor, an indicator of data density of the regions.

2. The method of claim 1, wherein:
   the validity score assigned to each data unit is specific to the region correlated with the data unit; and
   the region specific invalidity rates are determined based upon the data densities of the respective regions.

3. The method of claim 1, further comprising:
   subdividing a selected region into a plurality of smaller regions responsive to determining that the selected region has a data density exceeding a data density threshold.

4. The method of claim 1, further comprising:
   merging a plurality of selected regions into a single, larger region responsive to determining that the data density for each of the plurality of selected regions is below a data density threshold, wherein each of the plurality of selected regions is adjacent to at least one other one of the plurality of selected regions.

5. The method of claim 1, further comprising:
   updating the region specific data invalidity rates of the regions of the map according to the data density of each respective region over time.

6. The method of claim 1, wherein the data units include radio frequency data, the method further comprising:
   determining segments for a plurality of trajectories from the radio frequency data, wherein each segment includes at least one of a Wi-Fi feature or a magnetic field feature located at a particular distance along the segment;
   forming clusters of the segments according to radio frequency features identified within the segments; and
   generating routes for a map using the clusters.

7. A system, comprising:
   a processor programmed to initiate executable operations comprising:
   receiving data units from a plurality of communication devices over time, wherein each data unit comprises location information;
   correlating the data units with regions of a map using the location information;
   assigning, to each data unit, a validity score;
   for each data unit, decrementing the validity score of the data unit over time according to a region specific invalidity rate for the region correlated with the data unit;
   invalidating each data unit responsive to determining that the validity score of the data unit does not exceed a minimum validity score;
   determining data densities for regions, wherein a data density specifies a number of data units received from the region over a period of time; and
   presenting an indicator of data density of the regions.

8. The system of claim 7, wherein:
the validity score assigned to each data unit is specific to the region correlated with the data unit; and
the region specific invalidity rates are determined based upon the data densities of the respective regions.

9. The system of claim 7, wherein the processor is further programmed to initiate executable operations comprising:
subdividing a selected region into a plurality of smaller regions responsive to determining that the selected region has a data density exceeding a data density threshold.

10. The system of claim 7, wherein the processor is further programmed to initiate executable operations comprising:
merging a plurality of selected regions into a single, larger region responsive to determining that the data density for each of the plurality of selected regions is below a data density threshold, wherein each of the plurality of selected regions is adjacent to at least one other one of the plurality of selected regions.

11. The system of claim 7, wherein the processor is further programmed to initiate executable operations comprising:
updating the region specific data invalidity rates of the regions of the map according to the data density of each respective region over time.

12. The system of claim 7, wherein the data units include radio frequency data and the processor is further programmed to initiate executable operations comprising:
determining segments for a plurality of trajectories from the radio frequency data, wherein each segment includes at least one of a Wi-Fi feature or a magnetic field feature located at a particular distance along the segment;
forming clusters of the segments according to radio frequency features identified within the segments; and
generating routes for a map using the clusters.

13. A computer program product comprising a computer readable storage medium having program code stored thereon, the program code executable by a processor to cause the processor to:
receive data units from a plurality of communication devices over time, wherein each data unit comprises location information;
correlate the data units with regions of a map using the location information;
assign, to each data unit, a validity score;
for each data unit, decrement the validity score of the data unit over time according to a region specific invalidity rate for the region correlated with the data unit;
invalidate each data unit responsive to determining that the validity score of the data unit does not exceed a minimum validity score;
determine data densities for regions, wherein a data density specifies a number of data units received from the region over a period of time; and
present an indicator of data density of the regions.

14. The computer program product of claim 13, wherein:
the validity score assigned to each data unit is specific to the region correlated with the data unit; and
the region specific invalidity rates are determined based upon the data densities of the respective regions.

15. The computer program product of claim 13, wherein the program code is further executable by the processor to:
subdivide a selected region into a plurality of smaller regions responsive to determining that the selected region has a data density exceeding a data density threshold.

16. The computer program product of claim 13, wherein the program code is further executable by the processor to:
merge a plurality of selected regions into a single, larger region responsive to determining that the data density for each of the plurality of selected regions is below a data density threshold, wherein each of the plurality of selected regions is adjacent to at least one other one of the plurality of selected regions.

17. The computer program product of claim 13, wherein the data units include radio frequency data and the program code is further executable by the processor to:
determine segments for a plurality of trajectories from the radio frequency data, wherein each segment includes at least one of a Wi-Fi feature or a magnetic field feature located at a particular distance along the segment;
form clusters of the segments according to radio frequency features identified within the segments; and
generate routes for a map using the clusters.

\* \* \* \* \*